(12) United States Patent  (10) Patent No.: US 8,063,973 B2
Niwamae  (45) Date of Patent: Nov. 22, 2011

(54) IMAGING APPARATUS HAVING UNIT FOR REMOVING FOREIGN SUBSTANCE

(75) Inventor: Yuuki Niwamae, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 573 days.

(21) Appl. No.: 12/130,426

(22) Filed: May 30, 2008

(65) Prior Publication Data
US 2009/0002541 A1 Jan. 1, 2009

(30) Foreign Application Priority Data
Jun. 28, 2007 (JP) .................................. 2007-170723

(51) Int. Cl.
*H04N 5/225* (2006.01)

(52) U.S. Cl. ....................................... 348/335; 348/340
(58) Field of Classification Search ......................... None
See application file for complete search history.

(56) References Cited

U.S. PATENT DOCUMENTS
7,324,148 B2 1/2008 Takizawa
2004/0047625 A1* 3/2004 Ito et al. ........................ 396/429

FOREIGN PATENT DOCUMENTS
CN 1462145 A 12/2003
* cited by examiner

*Primary Examiner* — David Ometz
*Assistant Examiner* — Angel L Garces-Rivera
(74) *Attorney, Agent, or Firm* — Canon USA Inc IP Division

(57) ABSTRACT

An imaging apparatus includes an image sensor configured to convert an optical image of a subject into an electric signal, an optical member provided on an imaging optical axis in front of the image sensor, a vibrating device configured to vibrate the optical member, a status acquiring unit configured to acquire a status inside the imaging apparatus, and a control unit configured to control the vibrating device to vibrate the optical member at each of frequency steps into which a predetermined frequency band is divided and to change at least one of the frequency band, a number of frequency steps into which the frequency band is divided, and a time per frequency step based on the status acquired by the status acquiring unit.

6 Claims, 21 Drawing Sheets

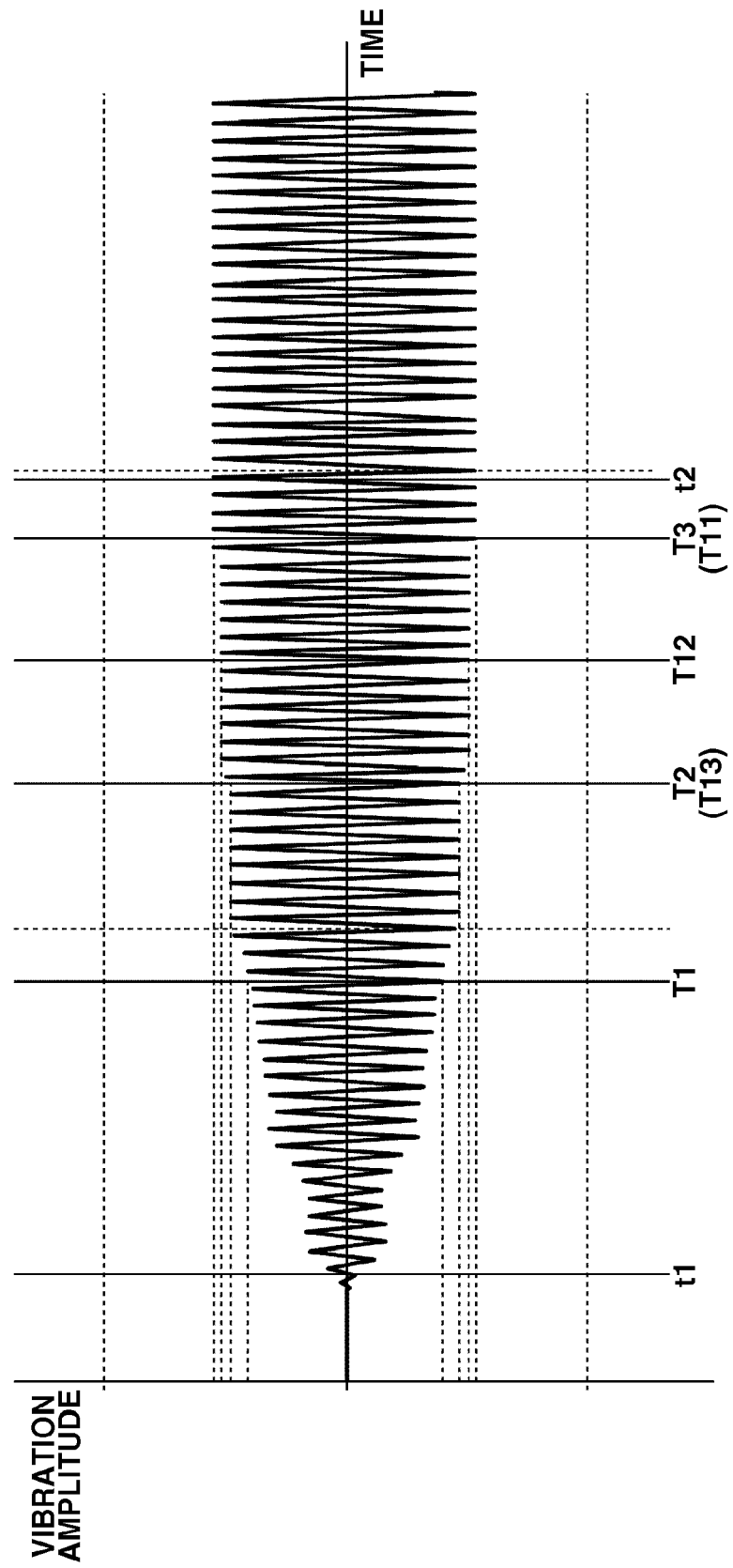

FIG.14

| FREQUENCY LEVEL | TEMPERATURE Temp | TIME T CORRESPONDING TO FREQUENCY STEP | THE NUMBER N OF FREQUENCY STEPS | FREQUENCY BAND F |
|---|---|---|---|---|
| LEVEL 1 | 50°C ≤ Temp < 60°C | T3 | N3 | F3 |
| LEVEL 2 | 40°C ≤ Temp < 50°C | T3 | N3 | F2 |
| LEVEL 3 | 30°C ≤ Temp < 40°C | T3 | N2 | F2 |
| LEVEL 4 | 20°C ≤ Temp < 30°C | T2 | N2 | F2 |
| LEVEL 5 | 10°C ≤ Temp < 20°C | T2 | N2 | F1 |
| LEVEL 6 | 0°C ≤ Temp < 10°C | T2 | N1 | F1 |
| LEVEL 7 | -10°C ≤ Temp < 0°C | T1 | N1 | F1 |

FIG.19

| FREQUENCY LEVEL | THE NUMBER C OF TIMES OF MANUAL CLEANING | TIME T CORRESPONDING TO FREQUENCY STEP | THE NUMBER N OF FREQUENCY STEPS | FREQUENCY BAND F |
|---|---|---|---|---|
| LEVEL 21 | $C4 \leq C$ | T13 | N12 | F12 |
| LEVEL 22 | $C3 \leq C < C4$ | T12 | N12 | F12 |
| LEVEL 23 | $C2 \leq C < C3$ | T12 | N12 | F11 |
| LEVEL 24 | $C1 \leq C < C2$ | T12 | N11 | F11 |
| LEVEL 25 | $0 \leq C < C1$ | T11 | N11 | F11 |

IMAGING APPARATUS HAVING UNIT FOR REMOVING FOREIGN SUBSTANCE

BACKGROUND OF THE INVENTION

1. Field of the Invention

The present invention relates to a technology for removing a foreign substance, such as dust, adhering to a surface of an optical member provided on an optical axis of an optical apparatus, such as an imaging apparatus.

2. Description of the Related Art

In imaging apparatuses, such as digital cameras, which perform imaging of a subject by converting a subject image into an electrical signal, an imaging light-beam is received by an image sensor. Then, a photoelectric conversion signal output from the image sensor is converted into image data. The image data is recorded on a recording medium, such as a memory card. A charge-coupled device (CCD) or a complementary metal-oxide semiconductor (CMOS) sensor can be used as the image sensor.

In such imaging apparatuses, an optical low-pass filter or an infrared cut filter is disposed on a subject side of the image sensor. When foreign substances, such as dust, adhere to the surfaces of the filter, the foreign substances produce black spots in a captured image. Consequently, visual quality of the image deteriorates.

In particular, in digital single-lens reflex cameras with interchangeable lenses, mechanical operating units, such as a shutter and a quick-return mirror, are disposed in vicinity of an image sensor. Sometimes, foreign substances, such as dust, are generated by the operating units and adhere to the surface of the image sensor or the filter. In addition, when the lens is changed, a foreign substance, such as dust, may enter the camera body from an opening of a lens mount and may adhere to the surface of the image sensor or the filter.

In order to avoid such phenomena, U.S. Pat. No. 7,324,148 discusses a technology for providing a dust-proof screen, which transmits an imaging light-beam, on a subject side of an image sensor, and for vibrating the dust-proof screen using a piezoelectric element to remove a foreign substance, such as dust, adhering to the surface of the dust-proof screen.

According to the technology discussed in U.S. Pat. No. 7,324,148, a voltage is applied to an electronic element joined to a dust-proof screen so as to remove a foreign substance adhering to the dust-proof screen. Then, the piezoelectric element is driven to displace the dust-proof screen in an optical-axis direction. Thus, screen vibrations are caused. In such a configuration, a space between the dust-proof screen and the image sensor is sealed with an elastic member, such as a rubber member. However, sometimes, attenuation of vibrations of the elastic member varies with the temperature of the vicinity of the dust-proof screen, so that an amplitude of the vibration of the dust-proof film changes.

When a user cleans directly the dust-proof screen using a cotton swab or lens cleaning paper, the dust-proof screen may be scratched. The failure probability of the dust-proof screen is increased according to the number of times of cleaning. Thus, unless the amplitude of vibration of the dust-proof screen during a foreign-substance removal operation is reduced with an increase in the number of times of cleaning thereof, there is a fear of breakage of the dust-proof screen.

A method of providing an electric circuit for applying a voltage to a piezoelectric element with a circuit capable of applying an appropriate voltage according to the temperature at driving thereof and the number of times of cleaning has been considered to solve such a problem. However, a plurality of step-up circuits and resistors are required to generate different voltages. This is a cause for increasing the cost and size of a digital single-lens reflex camera.

SUMMARY OF THE INVENTION

The present invention is directed to an imaging apparatus capable of efficiently removing a foreign substance, such as dust, adhering to a surface of an optical member while preventing an increase in the cost and size of the imaging apparatus.

According to an aspect of the present invention, an imaging apparatus includes an image sensor configured to convert an optical image of a subject into an electric signal, an optical member provided on an imaging optical axis in front of the image sensor, a vibrating device configured to vibrate the optical member, a status acquiring unit configured to acquire a status inside the imaging apparatus, and a control unit configured to control the vibrating device to vibrate the optical member at each of frequency steps into which a predetermined frequency band is divided and to change at least one of the frequency band, a number of frequency steps into which the frequency band is divided, and a time per frequency step based on the status acquired by the status acquiring unit.

According to another aspect of the present invention, a method is provided for controlling an imaging apparatus including an image sensor configured to convert an optical image of a subject into an electric signal, an optical member provided on an imaging optical axis in front of the image sensor, a vibrating device configured to vibrate the optical member, and a status acquiring unit configured to acquire a status inside the imaging apparatus. The method includes vibrating the optical member at each of frequency steps into which a predetermined frequency band is divided, and changing at least one of the frequency band, a number of frequency steps into which the frequency band is divided, a time per frequency step based on the status acquired by the status acquiring unit.

Also, according to yet another aspect of the present invention, a computer readable medium is provided containing computer-executable instructions for executing a method for controlling an imaging apparatus including an image sensor configured to convert an optical image of a subject into an electric signal, an optical member provided on an imaging optical system in front of the image sensor, a vibrating device configured to vibrate the optical member, and a status acquiring unit configured to acquire a status inside the imaging apparatus. Here, the medium includes computer-executable instructions for vibrating the optical member at each of frequency steps into which a predetermined frequency band is divided; and computer-executable instructions for changing at least one of the frequency band, a number of frequency steps into which the frequency band is divided, a time per frequency step based on the status acquired by the status acquiring unit. Moreover, further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 is a characteristic graph illustrating amplitudes of vibration of the infrared cut filter at application of a voltage, whose frequency is a resonant frequency of the infrared cut filter, to the piezoelectric element.

FIG. 14 is a table illustrating a relationship among a frequency level, a temperature, and three parameters.

FIG. 19 is a table illustrating a relationship among a frequency level, a temperature, and three parameters.

DETAILED DESCRIPTION OF THE EMBODIMENTS

Various exemplary embodiments, features, and aspects of the invention will be described in detail below with reference to the drawings.

First Exemplary Embodiment

Figure 1:
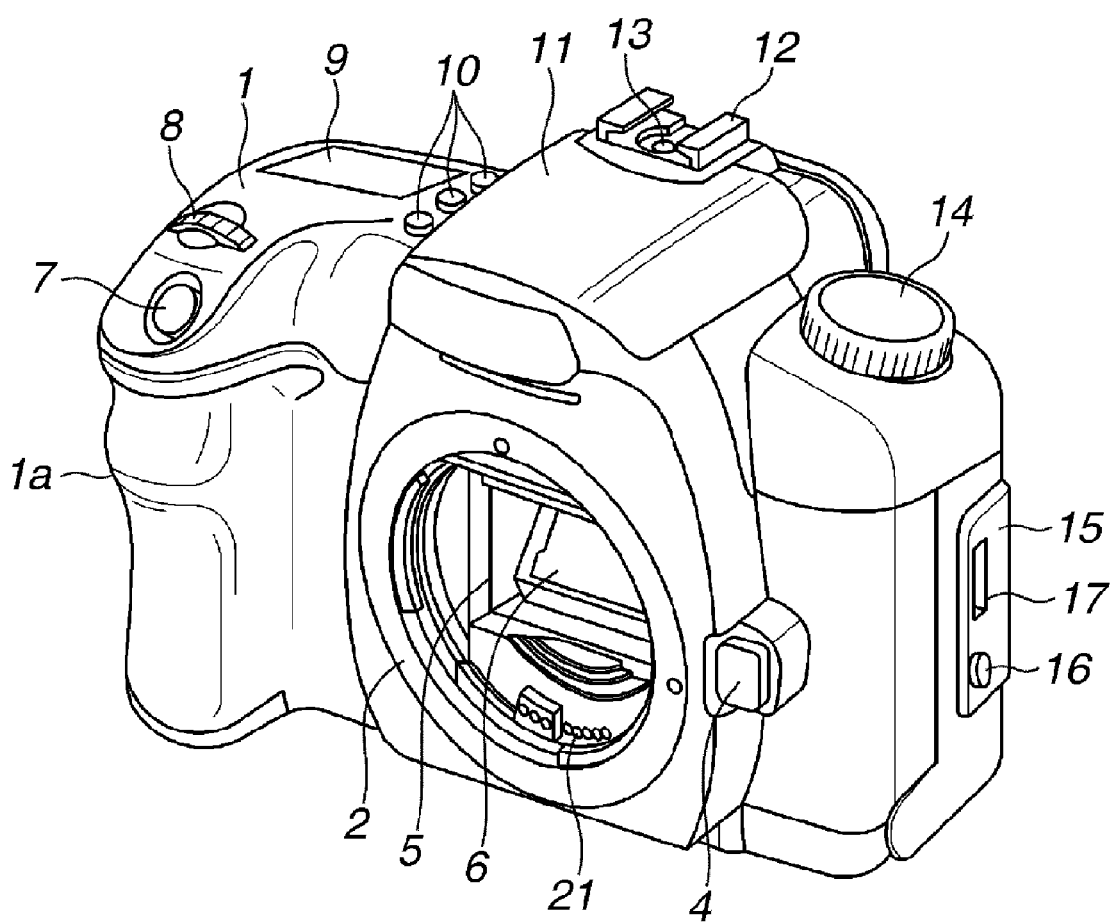
FIG. 1 is a perspective view of a front side of an example digital single-lens reflex camera according to an exemplary embodiment of the present invention.
Figure 2:
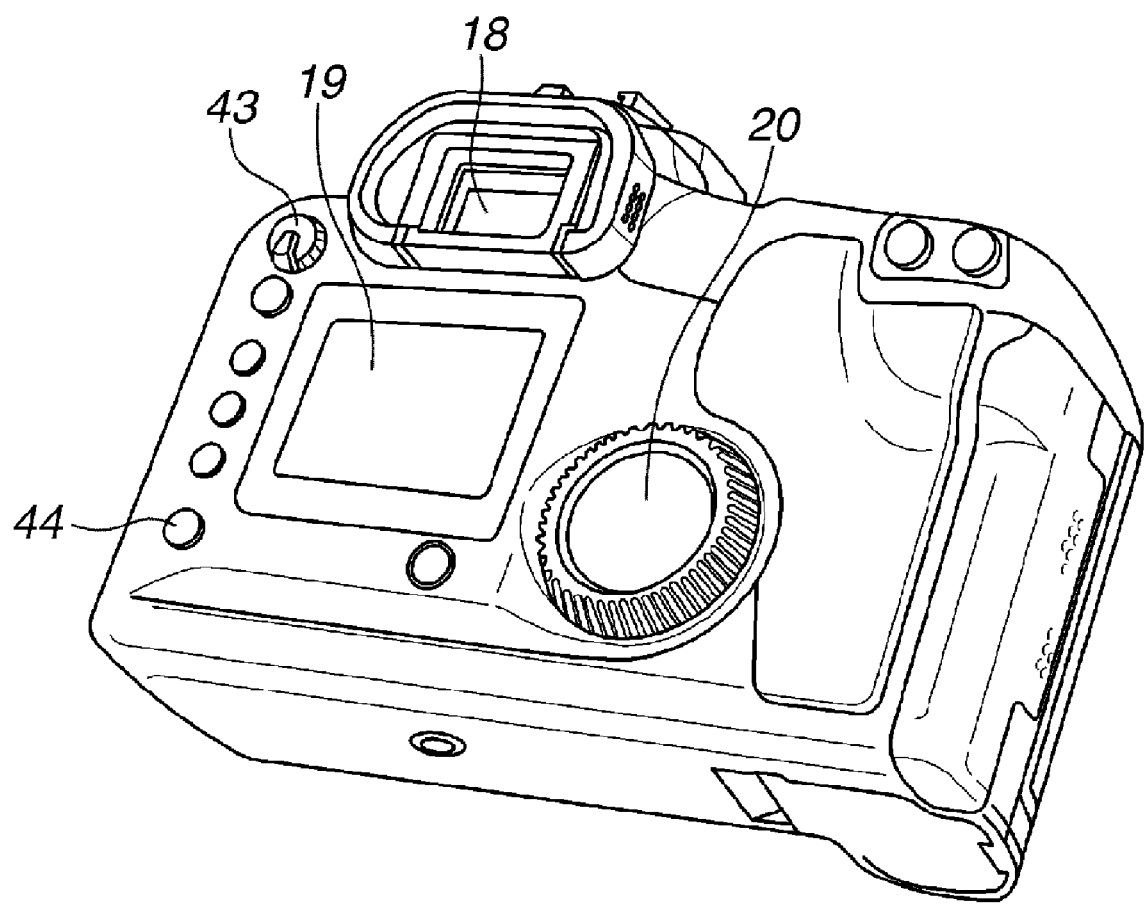
FIG. 2 is a perspective view of a rear side of the digital single-lens reflex camera according to the exemplary embodiment of the present invention.

FIGS. 1 and 2 illustrate an example of digital single-lens reflex camera according to a first exemplary embodiment of the present invention. FIG. 1 is a perspective view of the camera, which is taken from a front side (subject side) thereof. FIG. 1 illustrates the camera, from which a photographic lens unit is removed. FIG. 2 is a perspective view of the camera, which is taken from a photographer side (rear side).

As illustrated in FIG. 1, a camera body 1 has a grip portion 1a protruding towards a subject so that a photographer can stably hold the camera during photographing.

A photographic lens unit (not shown) is removably mounted on a lens mount 2 of the camera body 1. A mount contact 21 allows the camera body 1 to exchange a control signal, a status signal, and a data signal with the photographic lens unit. In addition, electrical power is supplied from the camera body 1 to the photographic lens unit via the mount contact 21.

The mount contact 21 can be configured to allow light communication and audio communication in addition to electrical communication between the camera body 1 and the photographic lens unit. A lens lock release button 4 is disposed on a side surface of the lens mount 2. The lens lock release button 4 can be pushed to remove the photographic lens unit from the camera body 1.

The camera body 1 is provided with a mirror box 5, to which an imaging light-beam having passed through the photographic lens is led. A main mirror (quick-return mirror) 6 is provided in the mirror box 5. The main mirror 6 can be held at an angle of 45° with respect to an imaging optical axis so as to lead the imaging light-beam to a pentagonal roof mirror 22 (see FIG. 3). The main mirror 6 can be held at a position retreating from the imaging optical axis to lead the imaging light-beam to an image sensor 33 (see FIG. 3).

A release button 7 serving as a photographing start switch, a main-operation dial 8 for setting a shutter speed and a lens F-number according to an operation mode at photographing, and an imaging top-surface operation mode setting button 10 are disposed on the side of the grip portion 1a at an upper part of the camera body 1. A part of operation results of these operating members is displayed on a liquid-crystal display (LCD) panel 9. A switch SW1 (7a in FIG. 3) is turned on by the first stroke of the release button 7. A switch SW2 (7b in FIG. 3) is turned on by the second stroke of the release button 7. The top-surface operation mode setting button 10 is used to determine which of a continuous photographing mode and a single photographing mode is selected by one push of the release button 7, and to set a self-timer photographing mode. Information on such settings is displayed on the LCD panel 9.

A flash unit 11, which can pop up from the camera body 1, and a shoe groove 12 and a flash contact 13, which can be used to mount an external flash unit, are provided at a central portion of the upper part of the camera body 1a.

A photographing-mode setting dial 14 is disposed to the right side of an upper part of the camera body 1.

An openable/closable external-terminal cover 15 is disposed on a side surface of the camera body 1, which is opposite to the grip portion 1a of the camera body 1. A video signal output jack 16 and a universal serial bus (USB) output connector 17, as an external interface, are mounted inside the external-terminal cover 15 of the camera body 1.

As illustrated in FIG. 2, a finder eyepiece window 18 is disposed at an upper part of the rear surface of the camera body 1. In addition, a color liquid-crystal monitor 19 capable of displaying an image is disposed in the vicinity of the center of the rear surface of the camera body 1.

A sub-operation dial 20 is disposed laterally adjacent to the color liquid-crystal monitor 19. The sub-operation dial 20 is an auxiliary unit for the main-operation dial 8. For example, in an automatic exposure (AE) mode of the camera, the sub-operation dial 20 is used for setting an exposure compensation amount for an optimal exposure value determined by an automatic exposure unit. In a manual mode in which a user determines a shutter speed and a lens F-number, the shutter speed is determined using the main-operation dial 8, while the lens F-number is determined using the sub-operation dial 20. In addition, the sub-operation dial 20 is used also for selecting a captured image to be displayed on the color liquid-crystal monitor 19.

A main switch 43 for starting and stopping an operation of the camera, and a cleaning instruction operating member 44 for operating the camera in a cleaning mode are disposed on the rear surface of the camera body 1. When the cleaning instruction operating member 44 is operated, a cleaning mode, in which a user directly cleans an infrared cut filter 410 (see FIGS. 3 and 5), is started. The expression "a user directly cleans" means that a user performs an operation for cleaning a foreign substance away from the surface of the infrared cut filter 410 with a cotton swab, lens cleaning paper, or a rubber member.

Figure 3:
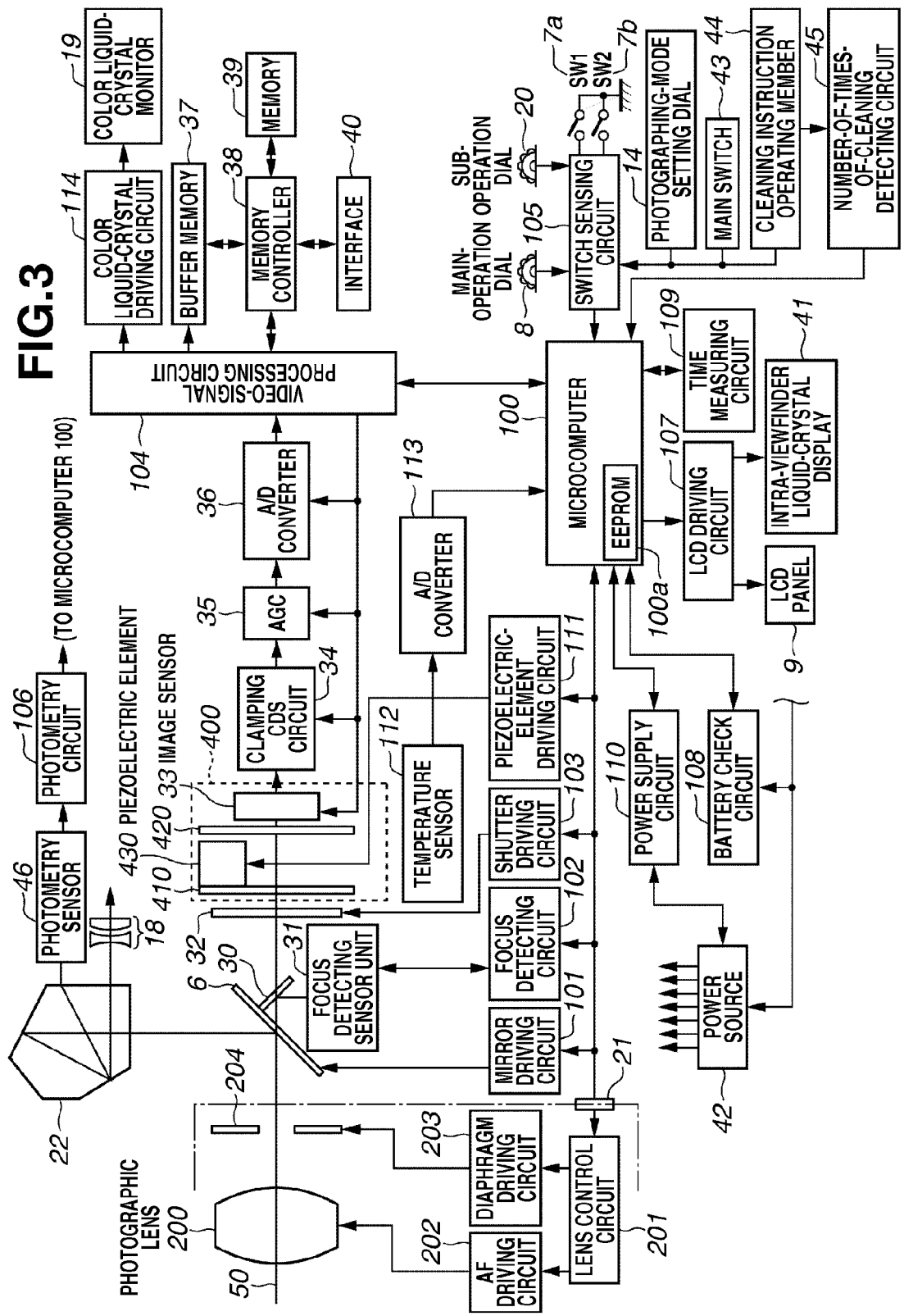
FIG. 3 is a block diagram illustrating an example electrical configuration of a digital single-lens reflex camera according to a first exemplary embodiment of the present invention.

FIG. 3 is a block diagram of a primary electrical configuration of the digital single-lens reflex camera according to the present embodiment. In FIG. 3, components similar to those illustrated in FIGS. 1 and 2 are designated by reference numerals used to denote similar components illustrated in FIGS. 1 and 2. An imaging optical axis 50 is set as illustrated in FIG. 3.

A central processing unit (hereinafter referred to as an "MPU") 100 including a microcomputer incorporated in the camera body 1 controls operations of the camera. The MPU 100 performs various processing on components of the camera and processes various instructions. An electrically erasable programmable read-only memory (EEPROM) 100a incorporated in the MPU 100 can store time information output from a time measuring circuit 109 and other various information.

A mirror driving circuit 101, a focus detecting circuit 102, a shutter driving circuit 103, a video-signal processing circuit 104, a switch sensing circuit 105, and a photometry circuit 106 are connected to the MPU 100. In addition, an LCD driving circuit 107, a battery check circuit 108, the time measuring circuit 109, a power supply circuit 110, and a piezoelectric-element driving circuit 111 are connected to the MPU 100. These circuits operate under the control of the MPU 100.

The MPU 100 communicates with a lens control circuit 201 in the photographic lens unit via the mount contact 21. The mount contact 21 has also a function of sending a signal to the MPU 100 when the photographic lens unit is connected to the camera body 1. Consequently, the lens control circuit 201 communicates with the MPU 100 to drive a photographic lens 200 and a diaphragm 204, which are provided in the photographic lens unit, via an auto focus (AF) driving circuit 202 and a diaphragm driving circuit 203, respectively. Although FIG. 3 illustrates only a single lens element of the signal photographic lens 200, for convenience of drawing, actually, the photographic lens 200 can include a number of lens elements.

The AF driving circuit 202 includes, e.g., a stepping motor. The AF driving circuit 202 changes a position of a focus lens in the photographic lens 200 under the control of the lens control circuit 201 such that an imaging light-beam is focused on the image sensor 33. The diaphragm driving circuit 203 includes, e.g., an auto iris. The diaphragm driving circuit 203 changes an aperture of the diaphragm 204 under the control of the lens control circuit 201 to obtain an optical F-number.

The main mirror 6 is held at an angle of 45° with respect to the imaging optical axis 50 illustrated in FIG. 3 and leads an imaging light-beam having passed through the photographic lens 200 to the pentagonal roof mirror 22. In addition, the main mirror 6 transmits a part of the imaging light-beam and leads the part of the imaging light-beam to a sub-mirror 30. The sub-mirror 30 leads the part of the imaging light-beam, which is transmitted by the main mirror 6, to a focus detecting sensor unit 31.

The mirror driving circuit 101 includes, e.g., a direct current (DC) motor and a gear train. The mirror driving circuit 101 drives the main mirror 6 to move to a position at which a user can observe a subject image through a finder or to a position at which the main mirror 6 retreats from the imaging optical axis 50. When the main mirror 6 is driven, the sub-mirror 30 moves to a position at which the imaging light-beam is led to the focus detecting sensor unit 31 or to a position at which the sub-mirror 30 retreats from the imaging optical axis 50.

The focus detecting sensor unit 31 includes a field lens disposed in the vicinity of an imaging plane (not shown), a reflecting mirror, a secondary imaging lens, a stop, and a line sensor including a plurality of charge-coupled devices (CCDs). The focus detecting sensor unit 31 performs a phase difference type focus detecting method. A signal output from the focus detecting sensor unit 31 is supplied to the focus detecting circuit 102. Then, the signal is converted into a subject image signal, which is then sent to the MPU 100. The MPU 100 performs a focus detecting operation according to the phase difference method using the subject image signal. Then, the MPU 100 determines a defocus amount and a defocus direction. Subsequently, the MPU 100 moves the focus lens in the photographic lens 200 to an in-focus position via the lens control circuit 201 and the AF driving circuit 202 according to the determined defocus amount and defocus direction.

The pentagonal roof mirror 22 reflects and converts an imaging light-beam reflected by the main mirror 6 into an erected non-reverse image. A photographer can observe a subject image from the finder eyepiece window 18 through the finder optical system. In addition, the pentagonal roof mirror 22 leads a part of the imaging light-beam to a photometry sensor 46. The photometry circuit 106 receives an output from the photometry sensor 46 and converts the received output into a luminance signal corresponding to each area of the observation plane, which is then output to the MPU 100. The MPU 100 calculates an exposure value based on the luminance signal.

A shutter unit (mechanical focal plane shutter) 32 is configured such that, when the photographer observes a subject image through the finder, a shutter leading curtain (first curtain) is at a light-shielding position, and a shutter trailing curtain (second curtain) is at an exposure position. Subsequently, at photographing, the shutter leading curtain performs an exposure travel from the light-shielding position to the exposure position. Thus, a light beam from a subject passes through the shutter unit 32. Then, the image sensor 33 performs imaging. After the lapse of a shutter speed time, the shutter trailing curtain performs a light-shielding travel from the exposure position to the light-shielding position. Thus, imaging is completed. The shutter unit 32 is controlled by a shutter driving circuit 103 having received an instruction from the MPU 100.

An imaging unit 400 includes an infrared cut filter 410, an optical low-pass filter 420, a piezoelectric element 430 serving as a piezoelectric member, and the image sensor 33, which are integrated into one unit.

The image sensor 33 photoelectrically converts a subject image. In the present embodiment, a CMOS sensor is used as the image sensor 33. However, any other imaging devices of various types, such as a CCD type, a CMOS type, and a charge injection device (CID) type, can be used as the image sensor 33.

The infrared cut filter 410 is a rectangular filter that eliminates high spatial frequency components. As will be described later, a surface of the infrared cut filter 410 is coated to have an electrical conductivity so as to prevent a foreign substance from adhering to the surface thereof.

The optical low-pass filter 420 is a filter that splits a light beam to be incident on the image sensor 33 into a plurality of light beams so as to effectively reduce generation of a spurious resolution signal and a spurious color signal. The optical low-pass filter 420 is formed by bonding and stacking a plurality of quartz birefringent plates and a plurality of quartz phase plates.

The piezoelectric element 430 is a single-plate piezoelectric device and is securely fixed to the infrared cut filter 410. The piezoelectric element 430 is configured such that vibrations thereof are transmitted to the optical low-pass filter 410.

A clamping correlated double sampling (CDS) circuit 34 performs basic analog processing on a signal before analog-to-digital (A/D) conversion of the signal. The clamping CDS circuit 34 can change a clamp level. An automatic gain controller (AGC) 35 also performs basic analog processing on a signal before A/D conversion of the signal. The AGC 35 can change a basic AGC level. An A/D converter 36 converts an analog signal output from the image sensor 33 into a digital signal.

The piezoelectric-element driving circuit 111 vibrates the piezoelectric element 430, which is securely fixed to the infrared cut filter 410. The piezoelectric-element driving circuit 111 vibrates the piezoelectric element 430 according to an instruction from the MPU 100 such that the vibration amplitude of the infrared cut filter 410 has a predetermined value. It will be described later how to drive the piezoelectric element 430.

A temperature sensor 112 is disposed in the vicinity of the infrared cut filter 410 and detects the temperature inside the camera body 1. The temperature sensor 112 outputs a signal representing a resistance value corresponding to the temperature inside the camera body 1. An A/D converter 113 performs an A/D conversion on a voltage divided by the temperature sensor 112. The A/D converter 113 outputs an A/D-converted value to the MPU 100 as a value representing the temperature inside the camera body 1.

The video-signal processing circuit 104 performs general hardware-based image processing, such as gamma/knee processing, filtering processing, and information synthesis processing for a monitor display, on digital image data. The video-signal processing circuit 104 outputs image data for a monitor display. The image data is displayed on the color liquid-crystal monitor 19 via a color liquid-crystal driving circuit 114. In addition, the video-signal processing circuit 104 can store image data in a buffer memory 37 via a memory controller 38 according to an instruction from the MPU 100. Further, the video-signal processing circuit 104 can compress image data in, e.g., a Joint Photographic Experts Group (JPEG) format. When images are continuously captured in, e.g., a continuous photographing mode, the image signal processing circuit 104 temporarily stores the image data in the buffer memory 37. Then, the video-signal processing circuit 104 sequentially reads out unprocessed image data from the buffer memory 37 via the memory controller 38. Consequently, the video-signal processing circuit 104 can sequentially perform image processing and compression processing, regardless of a rate of inputting the image data from the A/D converter 36.

The memory controller 38 has functions of storing image data, which is input from an external interface 40, in the memory 39, and outputting image data, which is stored in the memory 39, via the external interface 40. The video-signal output jack 16 and the USB output connector 17 illustrated in FIG. 1 correspond to the external interface 40. A flash memory, which is mountable in and demountable from the camera body 1, can be used as the memory 39.

The cleaning instruction operating member 44 receives, when operated by a user, a cleaning mode start instruction. Then, the cleaning instruction operating member 44 changes a mode of the camera body 1 to the cleaning mode. Although the present embodiment is provided with the cleaning instruction operating member 44, the present invention is not limited thereto. For example, an operating member for instructing a change of the mode to the cleaning mode is not limited to a mechanical button. A unit for instructing a change of the mode by selecting a menu displayed on the color liquid-crystal monitor 19 using a cursor key or an instruction button can be used as the operating member for instructing a change of the mode.

The power supply circuit 110 supplies electric power, which is necessary for the cleaning mode, to each component of the camera body 1, if necessary. In parallel with this, the battery check circuit 108 detects a remaining battery level of the power source 42 and sends a result of detecting the remaining battery level to the MPU 100. When receiving a signal for starting the cleaning mode, the MPU 100 retreats a mirror unit provided in the camera. That is, the MPU 100 drives the mirror 6 via the mirror driving circuit 101 to move to a position retreating from the imaging optical axis 50. Simultaneously, the MPU 100 drives the sub-mirror 30 via the mirror driving circuit 101 to move to a position retreating from the imaging optical axis 50. In addition, the MPU 100 opens a shutter portion provided in the camera. That is, the MPU 100 drives the mechanical focal plane shutter 32 via the shutter driving circuit 103 to move to a position retreating from the imaging optical axis 50. Then, in the cleaning mode, a user can clean directly a foreign substance adhering to the surface of the infrared cut filter 410 using a cotton swab, lens cleaning paper, or a rubber member.

A number-of-times-of-cleaning detecting circuit 45 for detecting the number of times of cleaning is connected to the cleaning instruction operating member 44. When the cleaning mode is started, the number-of-times-of-cleaning detecting circuit 45 detects the cumulative number of times of cleaning. Then, the number-of-times-of-cleaning detecting circuit 45 informs the MPU 100 of information representing the number of times of cleaning.

The switch sensing circuit 105 sends an input signal to the MPU 100 according to an operating state of each switch. The switch SW1 (7a) is turned on by the first stroke (half press) of the release button 7. The switch SW2 (7b) is turned on by the second stroke (full press) of the release button 7. When the switch SW2 (7*b*) is turned on, an instruction to start photographing is sent to the MPU 100. The main-operation dial 8, the sub-operation dial 20, the photographing-mode setting dial 14, the main switch 43, and the cleaning instruction operating member 44 are connected to the switch sensing circuit 105.

The LCD driving circuit 107 drives the LCD panel 9 and an intra-viewfinder liquid-crystal display unit 41 according to an instruction from the MPU 100.

The battery check circuit 108 checks a level of a battery according to an instruction from the MPU 100 and sends a result of checking the level to the MPU 100. A power source 42 supplies electrical power to each component of the camera.

The time measuring circuit 109 measures a time period from a moment, at which the main switch 43 is turned off, to a moment, at which the main switch 43 is turned on, and a date. The time measuring circuit 109 sends a result of measuring the time period to the MPU 100 according to an instruction from the MPU 100.

Figure 4:
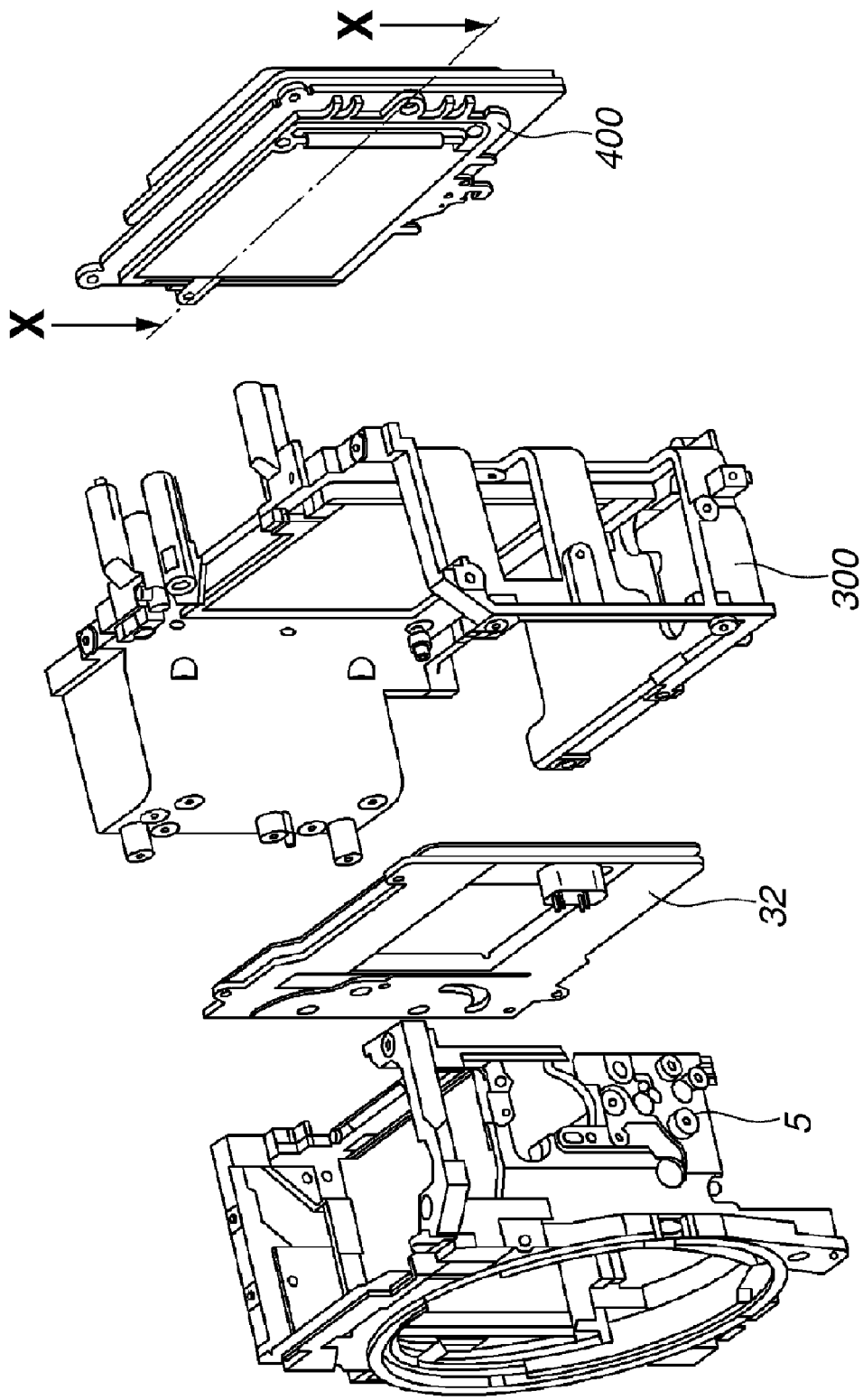
FIG. 4 is an exploded perspective view of an example configuration of the inside of a camera, which illustrates a structure for holding an imaging unit and a neighborhood thereof.

Next, a detail configuration of the imaging unit 400 is described below with reference to FIGS. 4 to 7. FIG. 4 is an exploded perspective view of a configuration of the inside of the camera, which illustrates a structure for holding the infrared cut filter 410 and a neighborhood of the image sensor 33. The mirror box 5 and the shutter unit 32 are located on a subject side of a body chassis 300, which is a framework of the camera body 1, in the order from the subject side. The imaging unit 400 is located on a photographer side of the body chassis 300. The imaging unit 400 is adjusted and fixed in position such that the imaging plane of the image sensor 33 is located at predetermined distance from and in parallel with a mounting surface of the lens mount 2, which serves as a reference for mounting the photographic lens unit.

Figure 5:
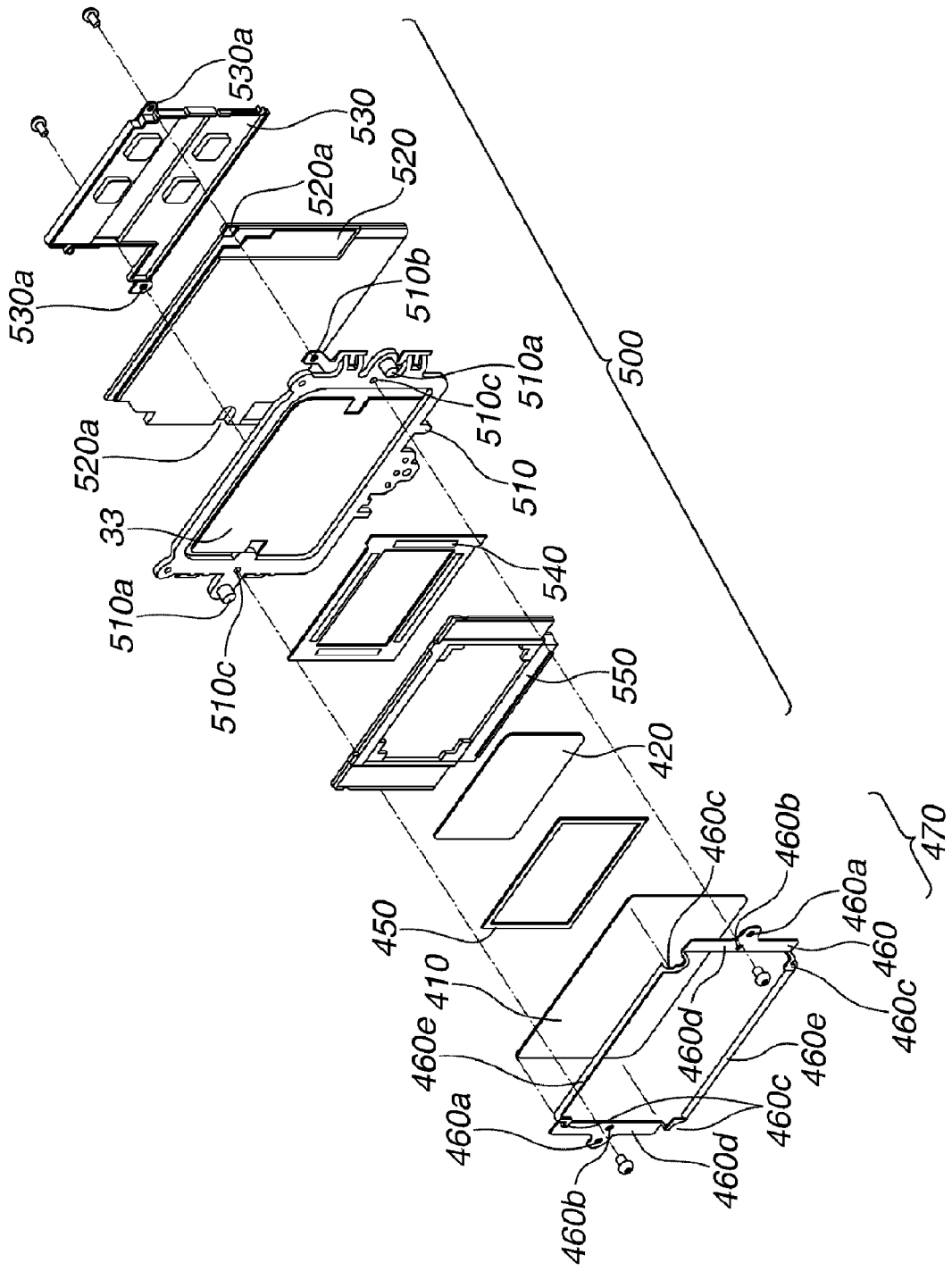
FIG. 5 is an exploded perspective view illustrating a configuration of the imaging unit.

FIG. 5 is an exploded perspective view illustrating a configuration of the imaging unit 400. The imaging unit 400 roughly includes a vibrating unit 470, an elastic member 450, and image sensor unit 500. Although details of the imaging unit 400 will be described later, the vibrating unit 470 is fixed to the image sensor unit 500 such that the vibrating unit 470 and the image sensor unit 500 sandwich the elastic member 450. More particularly, the elastic member 450 is sandwiched by the infrared cut filter 410 of the vibrating unit 470 and the image sensor unit 500.

The image sensor unit 500 includes the image sensor 33 and an image sensor holding member 510 for holding the image sensor 33. The image sensor unit 500 further includes a circuit board 520, a shield case 530, a light-shielding member 540, an optical low-pass filter holding member 550, and the optical low-pass filter 420.

The image sensor holding member 510 is made of metal and is provided with positioning pins 510*a* and screw holes 510*b* and 510*c*. An imaging-system electric circuit is mounted on the circuit board 520, which is provided with relief holes 520*a* for screws. The shield case 530 is made of metal and is provided with relief holes 530*a* for screws. The circuit board 520 and the shield case 530 are caught and locked by the image sensor holding member 510 with screws via the relief holes 520*a* and 530*a* and the screw hole 510*b*. The shield case 530 is connected to a ground potential to protect electric circuits from static electricity.

The light-shielding member 540 has an opening corresponding to an effective area of a photoelectric conversion surface of the image sensor 33. A sheet of double-sided adhesive tape is securely fixed to each of a subject side and a photographer side of the light-shielding member 540. The optical low-pass filter holding member 550 is securely fixed to a cover glass 33*a* (see FIG. 7) of the image sensor 33 with both of the sheets of double-sided adhesive tape of the light-shielding member 540. The optical low-pass filter 420 is positioned at the opening of the optical low-pass filter holding member 550 and is fixedly held on the light-shielding member 540 with double-sided adhesive tape.

Figure 6:
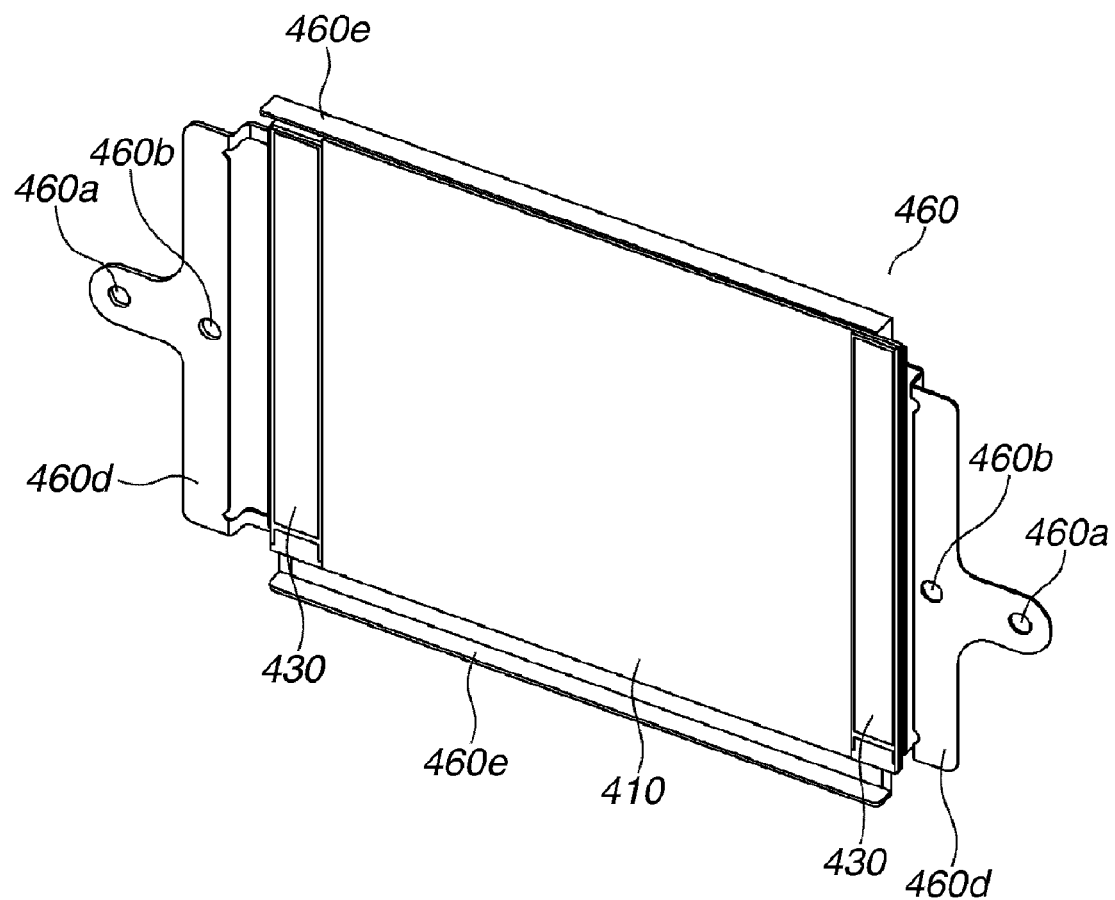
FIG. 6 is an exploded perspective view illustrating an example configuration of a vibrating unit.

FIG. 6 is a perspective view illustrating a configuration of the vibrating unit 470. The vibrating unit 470 includes the rectangular infrared cut filter 410, the piezoelectric element 430, and a holding member 460.

The holding member 460 is made of an elastic material, such as a metal, and is formed as a single component. The holding member 460 includes holding portions 460*c* provided at four corners (see FIG. 5), left and right arm portions 460*d* for connecting the holding portions 460*c*, and upper and lower planar portions 460*e* for connecting the holding portions 460*c*. The arm portions 460*d* are shaped like thin plates extending in an up-down direction at a position receded by one level towards the image sensor unit 500, as viewed in FIG. 5. The top and bottom ends of the arm portions 460*d* are integrally connected to the holding portion 460*c*. The arm portions 460*d* generate a biasing force for biasing the infrared cut filter 410 towards the image sensor unit 500. Positioning holes 460*a* and relief holes 460*b* for screws are formed in the arm portions 460*d*. The holding portions 460*c* are securely fixed in the vicinity of the four corners of the infrared cut filter 410, which include portions corresponding to nodes of a vibration, with an electrically conductive adhesive agent. The upper and lower planar portions 460*e* are bent to extend in an optical-axis direction parallel to the vibration of the infrared cut filter 410.

The piezoelectric element 430 is rigidly fixed to end portions of the infrared cut filter 410 with an adhesive agent. In the present embodiment, a total of two piezoelectric elements 430 of the same shape (elongated rectangle) are securely fixed to the left and right end portions of the infrared cut filter 410, respectively.

The vibrating unit 470 configured in this manner is positioned by inserting positioning pins 510*a* of the image sensor unit 500 into the positioning holes 460*a*, respectively. The vibrating unit 470 in this state is caught and locked by the image sensor unit 500 with screws via the relief holes 460*b* and the screw holes 510*c* such that the elastic member 450 is sandwiched between the vibrating unit 470 and the image sensor unit 500. Consequently, electricity charged on the surface of the infrared cut filter 410, which is coated to have electrical conductivity, can be discharged to the circuit board 520 via the holding member 460, the image sensor holding member 510, and the shield case 530. Accordingly, a foreign substance can be prevented from adhering to the surface of the infrared cut filter 410.

The elastic member 450 is formed of an elastic material, such as rubber. The elastic member 450 can serve as a vibration absorbing portion for the infrared cut filter 410. As will be described below, an enclosed space is formed by the elastic member 450, the infrared cut filter 410, and the optical low-pass filter 420. It is desirable that the elastic member 450 is constructed with a thick low-hardness member so as to enhance vibration absorbability and that the elastic member 450 contacts a portion corresponding to a node of the vibration of the infrared cut filter 410.

Figure 7:
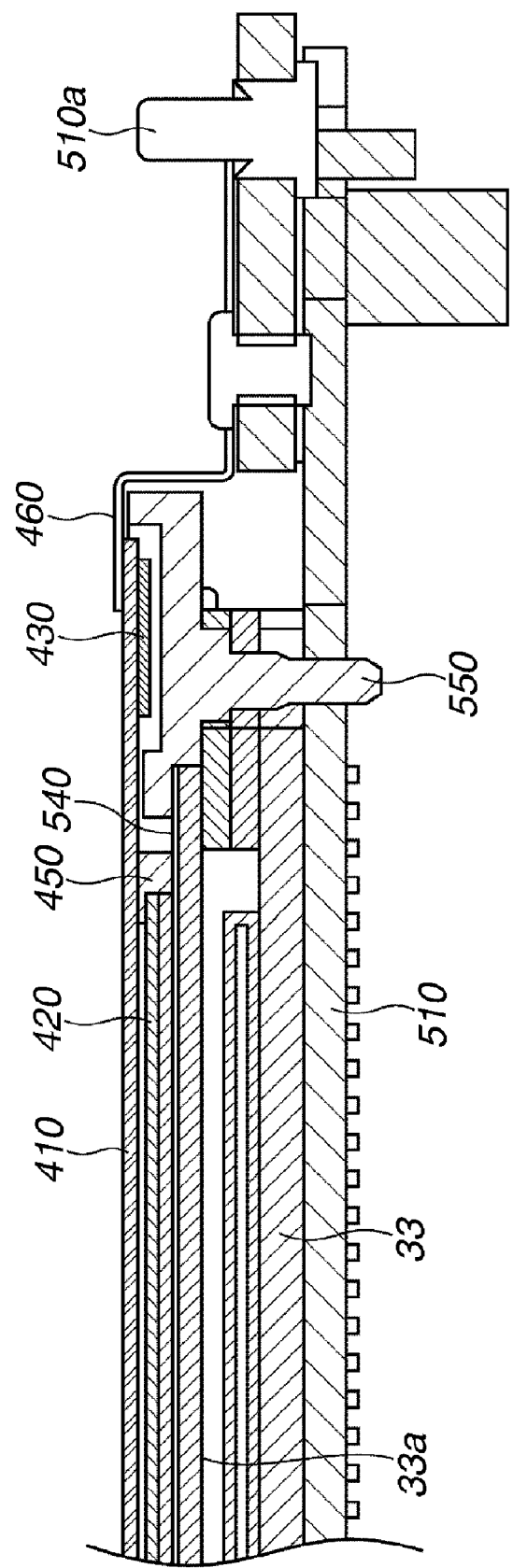
FIG. 7 is a cross-sectional view taken along line X-X illustrated in FIG. 4.

FIG. 7 is a cross-sectional view of the imaging unit 400, which is taken along line X-X illustrated in FIG. 4. A subject-side surface of the light-shielding member 540 contacts the optical low-pass filter 420. A photographer-side surface of the light-shielding member 540 contacts the cover glass 33*a* of the image sensor 33. A sheet of double-sided adhesive tape is rigidly fixed to each of the subject side and the photographer side of the light-shielding member 540. The optical low-pass filter 420 is fixed to and held by the cover glass 33*a* of the image sensor 33 with the sheets of double-sided adhesive tape fixed to the sides of the light-shielding member 540. Consequently, a space between the optical low-pass filter 420 and the cover glass 33*a* of the image sensor 33 is sealed with the light-shielding member 540. Thus, an enclosed space for preventing a foreign substance from entering the imaging unit 400 is formed.

A subject-side surface of the elastic member 450 contacts the infrared cut filter 410. A photographer-side surface of the elastic member 450 contacts the optical low-pass filter 420. The vibrating unit 470 is biased towards the side of the imaging unit 500 by elasticity of the holding member 460. Thus, the elastic member 450 and the infrared cut filter 410 are closely attached to each other without clearance. Also, the elastic member 450 and the optical low-pass filter 420 are closely attached to each other without clearance. Consequently, a space between the infrared cut filter 410 and the optical low-pass filter 420 is sealed with the elastic member 450. Accordingly, an enclosed space for preventing a foreign substance from entering the imaging unit 400 is formed.

A foreign-substance removing operation of the vibrating unit 470 is described below. When the piezoelectric-element driving circuit 111 applies a voltage of a predetermined frequency to the piezoelectric element 430, securely fixed to the infrared cut filter 410, under the control of the MPU 100, the piezoelectric element 430 expands and contracts in a direction perpendicular to the optical axis to cause bending vibrations of the infrared cut filter 410.

The frequency of the voltage to be applied to the piezoelectric element 430 is set at a value in the vicinity of a resonant frequency of an inherent mode of the infrared cut filter 410. Thus, a large amplitude of the vibration can be obtained with a low voltage applied to the piezoelectric element 430. The resonant frequency of the infrared cut filter 410 varies with temperature. Accordingly, the voltage to be applied to the piezoelectric element 430 is applied not at a constant frequency. A voltage whose frequency changes within a sufficient frequency band is applied to the piezoelectric element 430. More specifically, the frequency of the voltage to be applied to the piezoelectric element 430 starts to be swept from a frequency that is lower than the resonant frequency of the infrared cut filter 410. Then, the frequency of the voltage is swept at uniform intervals each of which is a frequency step width obtained by dividing a predetermined frequency band by a predetermined number of frequency steps such that the frequency of the voltage gradually increases at the uniform intervals. The sweeping of the frequency of the voltage finishes at a frequency that is higher than the resonant frequency of the infrared cut filter 410.

Figure 21:
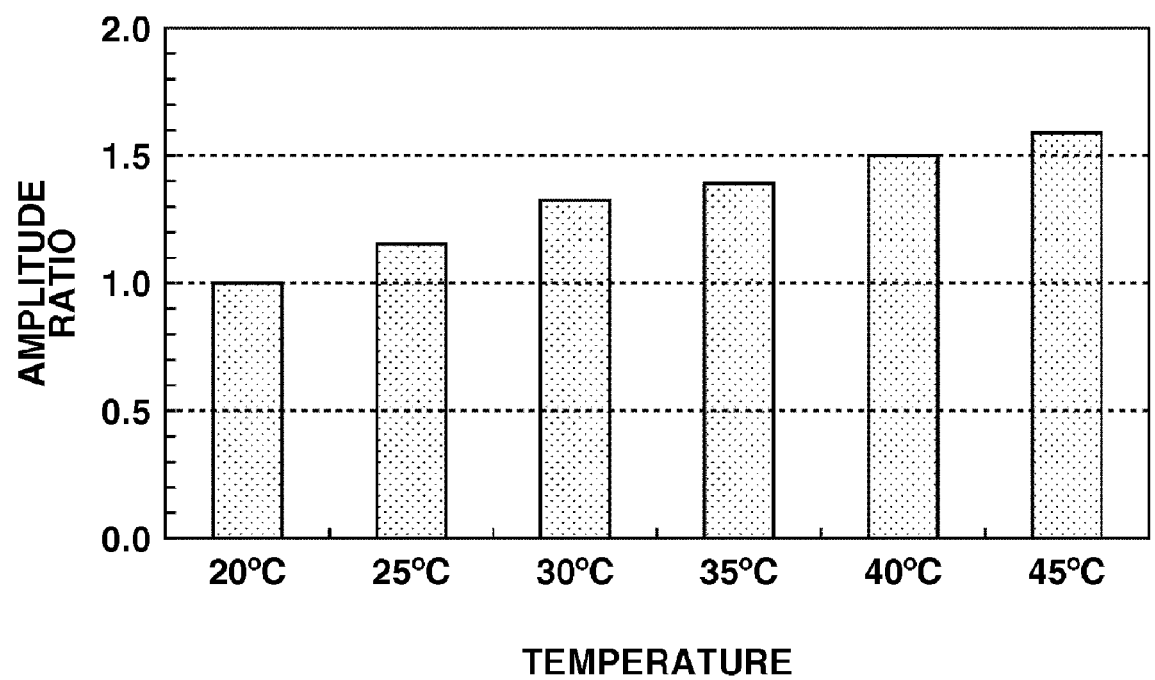
FIG. 21 is a characteristic graph illustrating a relationship between a temperature and an amplitude ratio.

On the other hand, in a case where the voltage to be applied to the piezoelectric element 430 is set to be constant, the amplitude of the vibration of the infrared cut filter 410 varies with temperature. FIG. 21 is a characteristic graph illustrating a relationship between the temperature and an amplitude ratio, which is measured using the imaging unit 400 according to the present embodiment. In FIG. 21, the abscissa axis represents temperature. The ordinate axis represents an amplitude ratio, which is determined based on the amplitude of the vibration of the infrared cut filter 410 at a temperature of 20° C. As illustrated in FIG. 21, the amplitude of the vibration of the infrared cut filter 410 is large at high temperature. Thus, there is a fear of breakage of the infrared cut filter 410. On the other hand, the amplitude of the vibration of the infrared cut filter 410 is small at low temperature. Thus, there is a fear that an amplitude of the vibration, which is determined to be required to remove a foreign substance, cannot be obtained. Such a change of temperature can be dealt with by changing at least one of the frequency band, the number of frequency steps by which the frequency band is divided, and a time per frequency step, as will be described below.

Figure 8A:
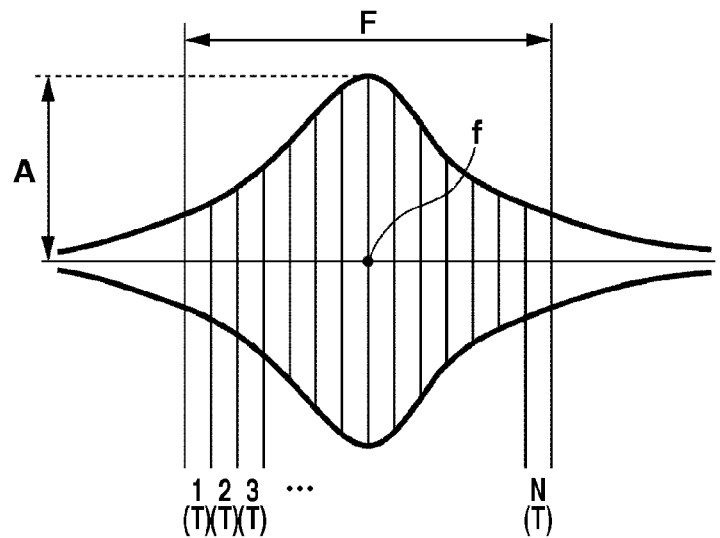
FIGS. 8A to 8C are characteristic graphs each illustrating a relationship between frequencies of a voltage to be applied to a piezoelectric element and amplitudes of vibration of the infrared cut filter.
Figure 8B:
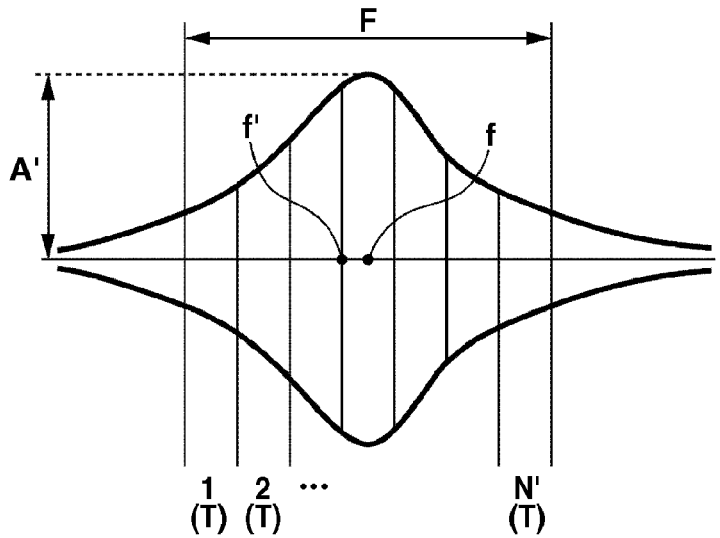
Figure 8C:
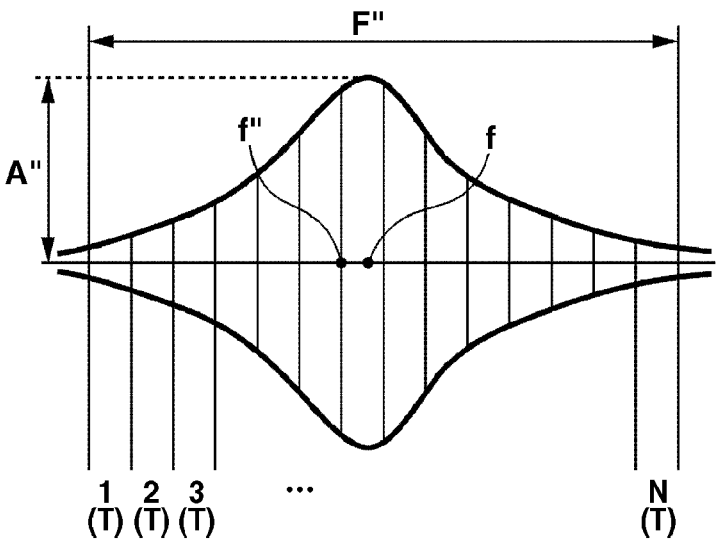

FIGS. 8A to 8C are characteristic graphs each illustrating a relationship between the frequency of the voltage to be applied to the piezoelectric element 430 and the amplitude of the vibration of the infrared cut filter 410. In each of FIGS. 8A to 8C, the abscissa axis represents the frequency. The ordinate axis represents the amplitude of the vibration. F denotes a frequency band with the resonant frequency f of the infrared cut filter 410 set as a center. N represents the number of frequency steps. T denotes a time per frequency step. The frequency of the voltage is swept at every interval obtained by dividing the frequency band F by the number N of frequency steps. The voltage is applied to the piezoelectric element 430 at each swept frequency for a time T (seconds) per frequency step. That is, a time for which the frequency of the voltage is swept across the frequency band F is N×T (seconds).

The relationship between the amplitude of the vibration of the infrared cut filter 410 and each of the time T per frequency step, the number N of frequency steps, and the frequency band F is described below.

FIG. 9 is a characteristic graph illustrating the amplitude of the vibration of the infrared cut filter 410 when a voltage whose frequency is the resonant frequency f of the infrared cut filter 410 is applied to the piezoelectric element 430. In FIG. 9, the abscissa axis represents time, and the ordinate axis represents the amplitude of the vibration of the infrared cut filter 410. Time periods T1, T2, T3, T11, and T12 are those elapsed from a point of time t1 of start of application of the voltage, and are parameters in FIGS. 14 and 19. In a case where application of the voltage to the piezoelectric element 430 is started at the point of time t1, a transient vibration is caused in which the amplitude of the vibration of the infrared cut filter 410 gradually increases. Thereafter, at a point of time t2, the infrared cut filter 410 leads to a steady vibration.

In a case where the time T per frequency step is set to be longer than (t2–t1), i.e., a case where the time T per frequency step is set such that the infrared cut filter 410 leads to a steady vibration in one frequency step, the frequency of the voltage to be applied to the piezoelectric element 430 is swept to the next frequency step after a large amplitude of the vibration of the infrared cut filter 410 is generated in one frequency step. Accordingly, the infrared cut filter 410 obtains a large amplitude of the vibration at the resonant frequency f thereof illustrated in FIG. 8A.

On the other hand, in a case where the time T per frequency step is set to be shorter than (t2–t1), i.e., a case where the time T per frequency step is set such that the infrared cut filter 410 causes a transient vibration in one frequency step, the frequency of the voltage to be applied to the piezoelectric element 430 is swept to the next frequency step while still a small amplitude of the vibration of the infrared cut filter 410 is generated in one frequency step. Accordingly, the infrared cut filter 410 obtains a small amplitude of the vibration at the resonant frequency f thereof illustrated in FIG. 8A.

Thus, the amplitude of the vibration of the infrared cut filter 410 can be controlled by changing the time T per frequency step. More particularly, in a case where a waveform of the vibration in the frequency band F of the infrared cut filter 410 is smooth, i.e., a case where the amplitude of the vibration does not greatly change even when the number N of frequency steps and the frequency band F are changed, as will be described later, the amplitude of the vibration of the infrared cut filter 410 can effectively be controlled.

Figure 10:
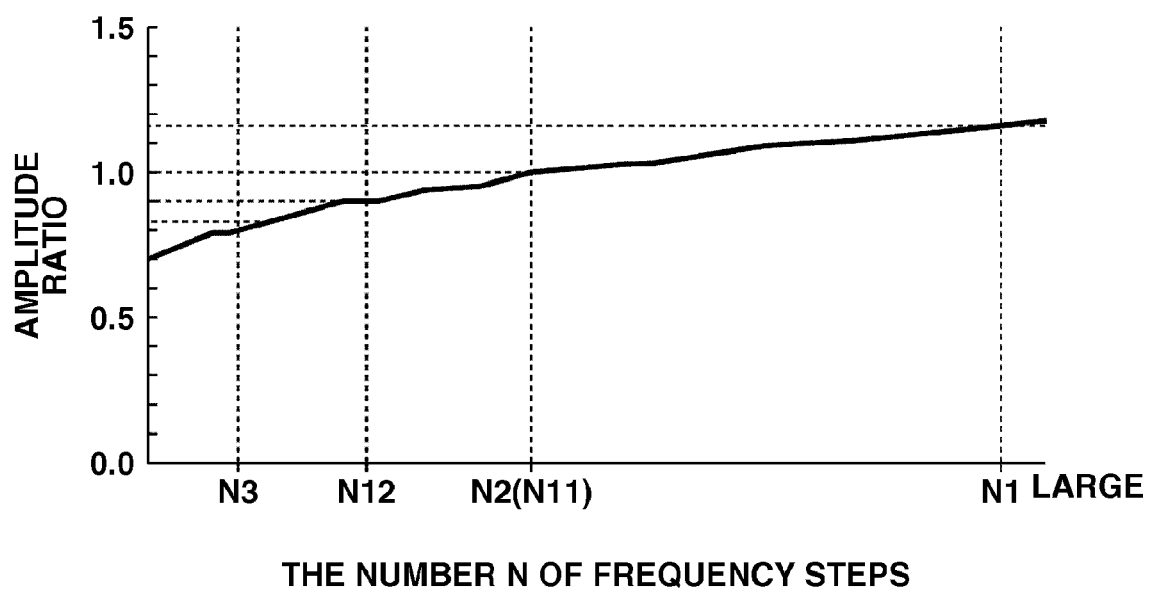
FIG. 10 is a characteristic graph illustrating a relationship between the number of frequency steps and the maximum vibration amplitude of the infrared cut filter, which is measured when one frequency step time and a frequency band to be swept are fixed.

FIG. 10 is a characteristic graph illustrating a relationship between the number N of frequency steps and the maximum amplitude of the vibration of the infrared cut filter 410, which is measured by fixing the time T per frequency step and the frequency band F to be swept. In FIG. 10, the abscissa axis represents the number N of frequency steps. The ordinate axis represents an amplitude ratio of the maximum amplitude of the vibration of the infrared cut filter 410 to a reference that is the maximum amplitude of the vibration of the infrared cut filter 410 in a case where the number N of frequency steps is N2. The numbers of frequency steps N1, N2, N3, N11, and N12 are parameters illustrated in FIGS. 14 and 19, which will be described below.

As is understood from FIG. 10, the maximum amplitude of the vibration of the infrared cut filter 410 increases with an increase in the number N of frequency steps. Conversely, the maximum amplitude of the vibration of the infrared cut filter 410 decreases with a decrease in the number N of frequency steps. The reason is as follows. That is, in a case where the number N of frequency steps is large, as illustrated in FIG. 8A, the resonant frequency f of the infrared cut filter 410 is captured. Thus, the amplitude A at the resonance of the infrared cut filter 410 is the maximum amplitude. On the other hand, in a case where the number N' of frequency steps is small, as illustrated in FIG. 8B, the resonant frequency f of the infrared cut filter 410 is skipped. Thus, the amplitude A' (A'<A) at a frequency f' in the vicinity of the resonant frequency f of the infrared cut filter 410 is the maximum amplitude.

The amplitude of the vibration of the infrared cut filter 410 can be controlled by changing the number N of frequency steps in this manner. In particular, in a case where the waveform of the vibration of the infrared cut filter 410 in the frequency band F is steep, a difference between the amplitudes A and A' is large. Thus, this method is effective, because the amplitude A' can greatly be controlled by changing the number N of frequency steps.

Figure 11:
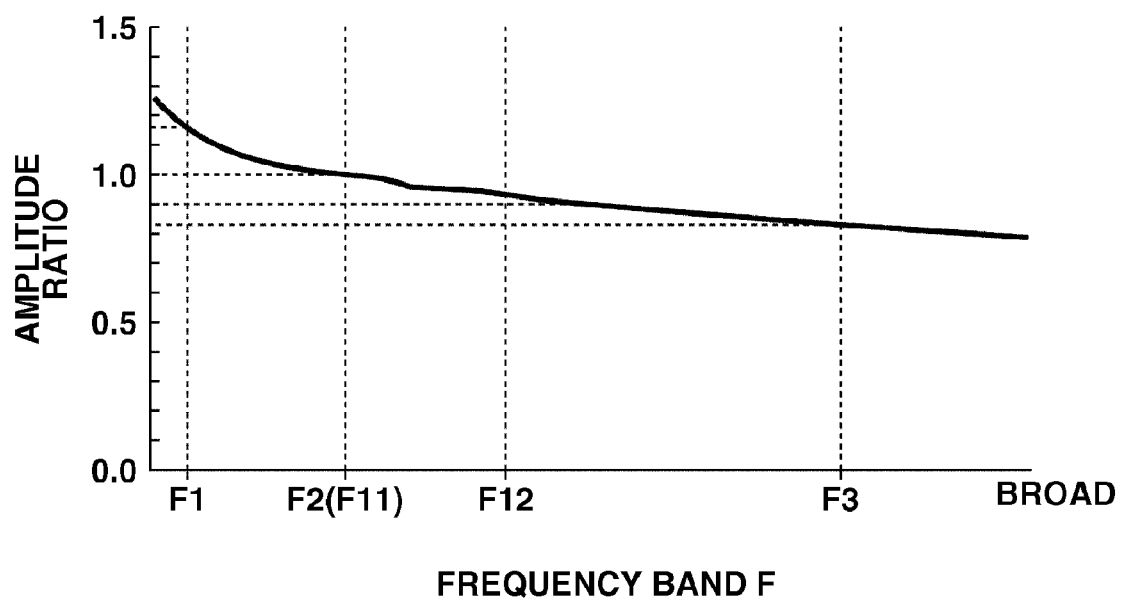
FIG. 11 is a characteristic graph illustrating a relationship between the frequency band and the maximum vibration amplitude of the infrared cut filter, which is measured when one frequency step time and the number of frequency steps used for sweeping.

FIG. 11 is a characteristic graph illustrating a relationship between the frequency band F and the maximum vibration amplitude of the infrared cut filter 410, which is measured by fixing the time T per frequency step and the number N of frequency steps used for sweeping. In FIG. 11, the abscissa axis represents the frequency band F. The ordinate axis represents an amplitude ratio of the maximum amplitude of the vibration of the infrared cut filter 410 to a reference that is the maximum amplitude of the vibration of the infrared cut filter 410 in the frequency band F. Frequency band numbers F1, F2, F3, F11, and F12 are parameters illustrated in FIGS. 14 and 19, which will be described below.

As is understood from FIG. 11, the maximum amplitude of the vibration of the infrared cut filter 410 increases with a decrease in the width of the frequency band F. On the other hand, the maximum amplitude of the vibration of the infrared cut filter 410 decreases with an increase in the width of the frequency band F. The reason is as follows. That is, in a case where the frequency band is narrow, as illustrated in FIG. 8A, the resonant frequency f of the infrared cut filter 410 is captured. Thus, the amplitude A at the resonance of the infrared cut filter 410 is the maximum amplitude. On the other hand, in a case where the frequency band F'' is broad, as illustrated in FIG. 8C, the resonant frequency f of the infrared cut filter 410 is skipped. Thus, the amplitude A'' (A''<A) at a frequency f'' in the vicinity of the resonant frequency f of the infrared cut filter 410 is the maximum amplitude.

The amplitude of the vibration of the infrared cut filter 410 can be controlled by changing the frequency band F in this manner. In particular, in a case where the waveform of the vibration of the infrared cut filter 410 in the frequency band F is steep, a difference between the amplitudes A and A'' is large, similar to the case of changing the number N of frequency steps. Thus, this method is effective, because the amplitude A'' can greatly be controlled by changing the frequency band F. A sweep time (=(the time T per frequency step)×(the number N of frequency steps)) is not changed when the frequency band F is changed. Therefore, this method is effective in a case where the sweep time is predefined, e.g., when the infrared cut filter 410 continues to vibrate only for a definite period of time to prevent a foreign substance, which has been removed by the vibration thereof, from readhering thereto.

Figure 12:
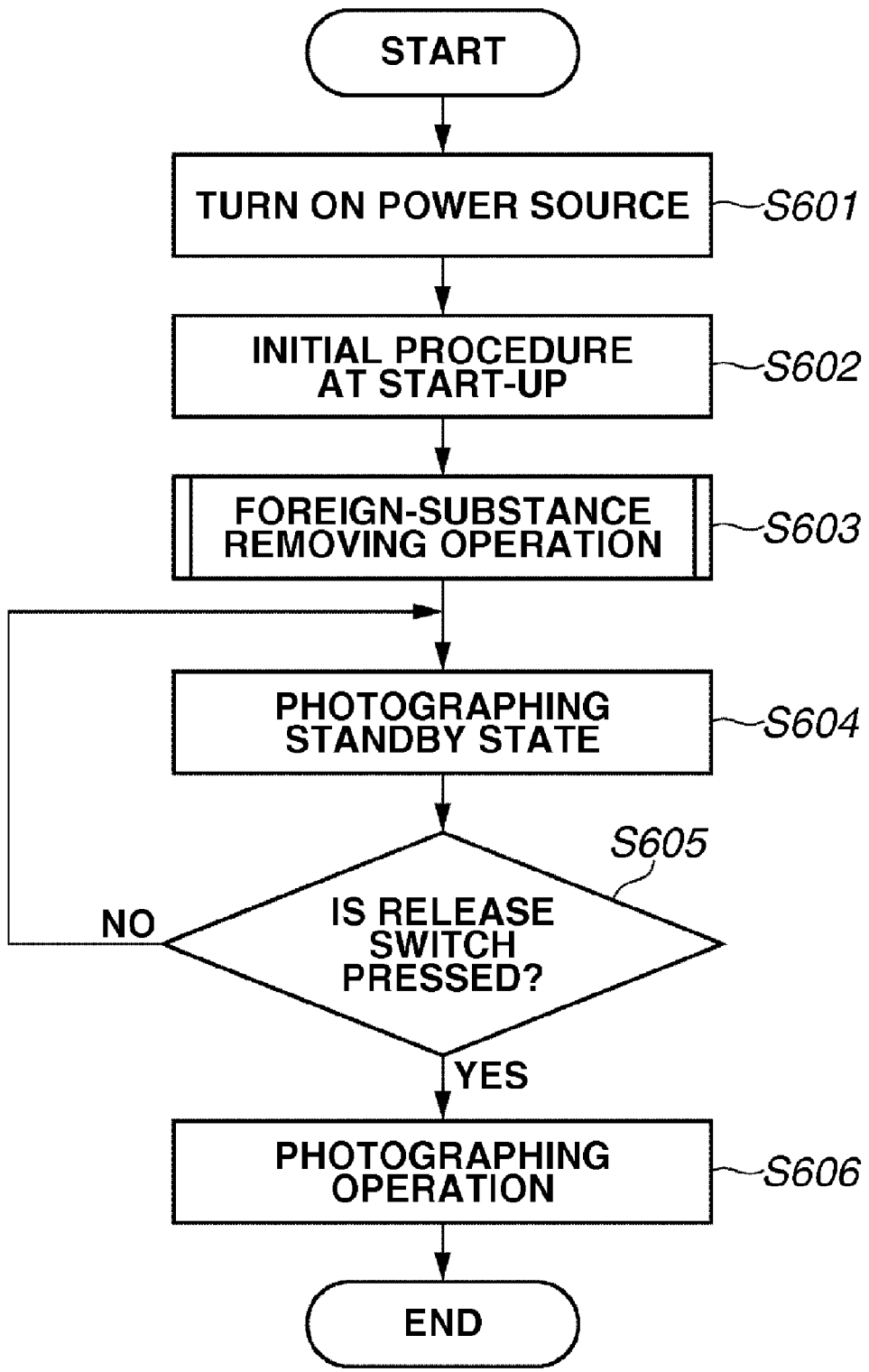
FIG. 12 is a flowchart illustrating an example procedure for a processing operation executed by a micro processing unit (MPU).

FIG. 12 is a flowchart illustrating a procedure for a processing operation executed by the MPU 100. As illustrated in FIG. 12, in step S601, the MPU 100 turns on the power source 42 of the camera body 1 and starts up the camera body 1 when the main switch 43 is depressed. Next, in step S602, the MPU 100 performs an initial procedure at start-up of the camera body 1. The initial procedure includes checking of a power-source voltage level, that of abnormality of a switch (SW) system provided in the camera body 1, confirmation of presence/absence of a recording medium, that of mounting of a lens, and initialization for photographing.

Next, in step S603, the MPU 100 executes a foreign-substance removing operation (see FIG. 13), which will be described below, to remove a foreign substance adhering to the surface of the infrared cut filter 410 of the imaging unit 400. Then, in step S604, the camera body 1 is brought into a photographing standby state. In step S605, the MPU 100 monitors the release button 7 and determines whether the release button (release switch) 7 is pressed. If the MPU 100 determines that the release button 7 is not pressed (NO in step S605), the MPU 100 returns to step S604, in which the MPU 100 maintains the photographing standby state. On the other hand, if the MPU 100 determines that the release button 7 is pressed (YES in step S605), the MPU 100 proceeds to step S606, in which the MPU 100 performs a photographing operation. Then, the processing ends.

Figure 13:
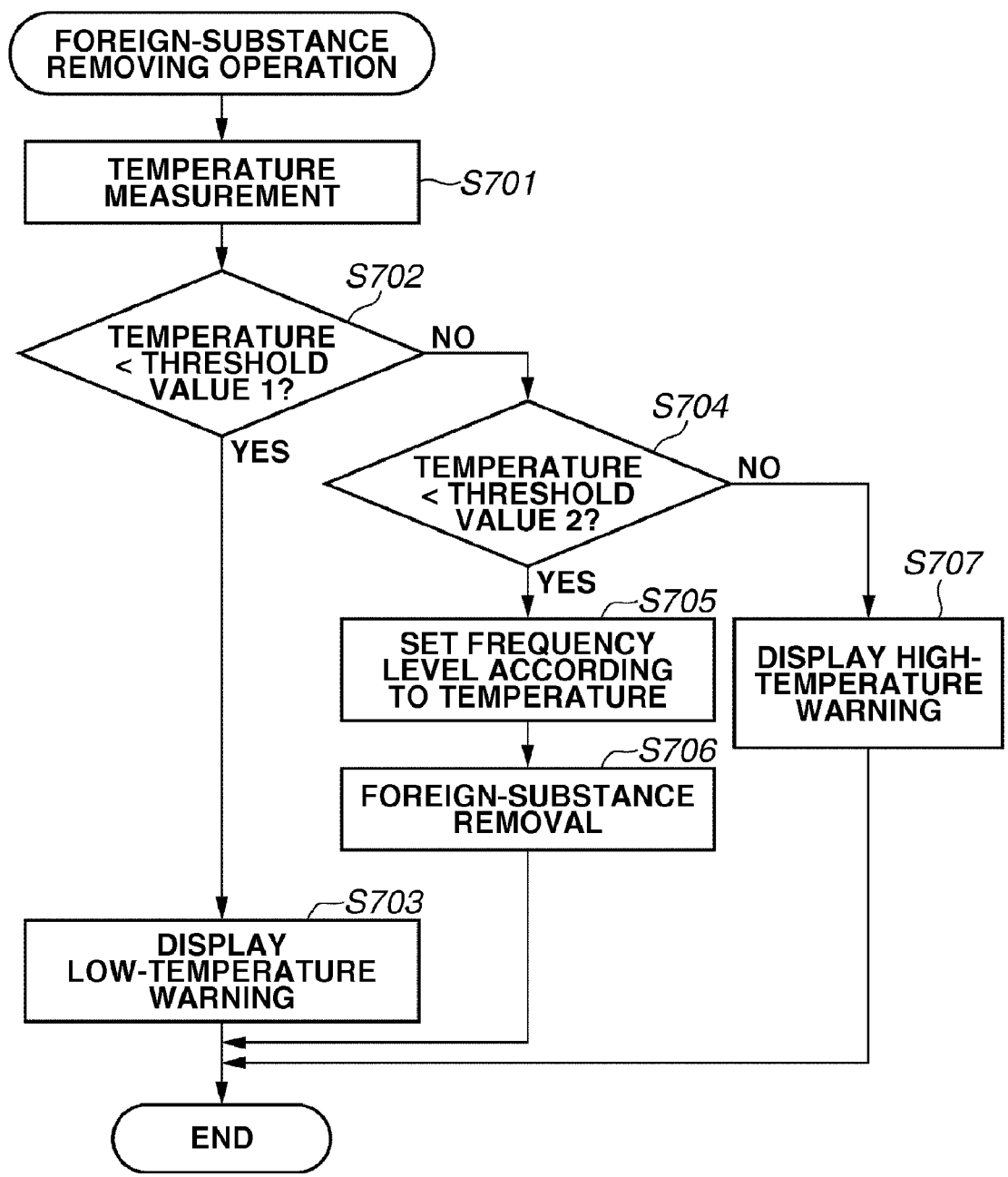
FIG. 13 is a flowchart illustrating an example operation for removing a foreign substance according to the first exemplary embodiment of the present invention.

FIG. 13 is a flowchart illustrating the foreign-substance removing operation performed in step S603 illustrated in FIG. 12. In this operation, the MPU 100 sets a frequency level of a voltage to be applied to the piezoelectric element 430 according to a temperature inside the camera body 1 such that the amplitude of the vibration of the infrared cut filter 410 falls within a predetermined range of vibration amplitudes. The predetermined range of vibration amplitudes is determined according to a vibration amplitude at normal temperature and is set such that there is no fear of breakage of the infrared cut filter 410 and that a foreign substance can sufficiently be removed according to the predetermined range. Accordingly, when the inside of the camera body 1 is at high temperature or at low temperature, the frequency level of the voltage is changed such that the amplitude of the vibration of the infrared cut filter 410 becomes equal to that of the vibration thereof at normal temperature.

In a case where a temperature inside the camera body 1 is very high such that there is a fear that a stress generated due to the amplitude of the vibration of the infrared cut filter 410 exceeds a predetermined stress, the MPU 100 causes the color liquid-crystal monitor 19 to display a warning message indicating that a foreign-substance removing operation cannot be performed. Simultaneously, the MPU 100 inhibits a foreign-substance removing operation. This is the same with a case where the infrared cut filter 410 cannot obtain a vibration amplitude required for removing a foreign substance at any frequency levels.

As illustrated in FIG. 13, in step S701, the temperature sensor 112 detects a temperature inside the camera body 1 and outputs a resistance value based on the temperature inside the camera body 1. The A/D converter 113 performs an A/D conversion of a voltage divided by the temperature sensor 112 and outputs an A/D-converted value to the MPU 100 as a temperature inside the camera body 1.

In step S702, the MPU 100 determines whether the temperature inside the camera body 1 is lower than a first threshold value (THRESHOLD VALUE 1). In the present embodiment, the first threshold value is −10° C., as will be described below.

If a result of determination in step S702 is that the temperature inside the camera body 1 is less than the first threshold value (YES in step S702), the MPU 100 proceeds to step S703. In the case where the temperature inside the camera body 1 is less than the first threshold value, there is a possibility that even when one of the parameters, i.e., the frequency band F, the number N of frequency steps, and the time T per frequency step, is changed, a vibration amplitude that is considered to be required to remove a foreign substance cannot be obtained. In step S703, the MPU 100 causes the color liquid-crystal monitor 19 to display a warning message indicating that the vibration amplitude is less than a predetermined value required to remove a foreign substance due to low temperature and that a foreign removing operation cannot be performed. In addition, the MPU 100 inhibits a foreign-substance removing operation. Then, the processing ends.

On the other hand, if a result of determination in step S702 is that the temperature inside the camera body 1 is equal to or higher than the first threshold value (NO in step S702), the MPU 100 proceeds to step S704. In step S704, the MPU 100 determines whether the temperature inside the camera body 1 is less than a second threshold value (THRESHOLD VALUE 2). In the present embodiment, the second threshold value is 60° C., as will be described below.

If a result of determination in step S704 is that the temperature inside the camera body 1 is less than the second threshold value (YES in step S704), the MPU 100 proceeds to step S705. In the case where the temperature inside the camera body 1 is less than the second threshold value, a change of one of the parameters, i.e., the frequency band F, the number N of frequency steps, and the time T per frequency step, does not cause a stress that is generated due to the amplitude of the vibration of the infrared cut filter 410 to exceed a predetermined stress. The predetermined stress is set as follows. That is, first, a strength distribution of the infrared cut filter 410 is determined by performing a failure test of the infrared cut filter 410 using a large number of samples. Then, the predetermined stress is set according to a safety rate or a failure probability, which is obtained according to the strength distribution of the infrared cut filter 410. The strength distribution of the infrared cut filter 410 depends upon a process of manufacturing the infrared cut filter 410, a surface coating, and the number of times of cleaning thereof by a user. It is required to determine the strength distribution of the infrared cut filter 410 from those of the infrared cut filter 410, which are obtained according to the respective conditions.

Figure 15:
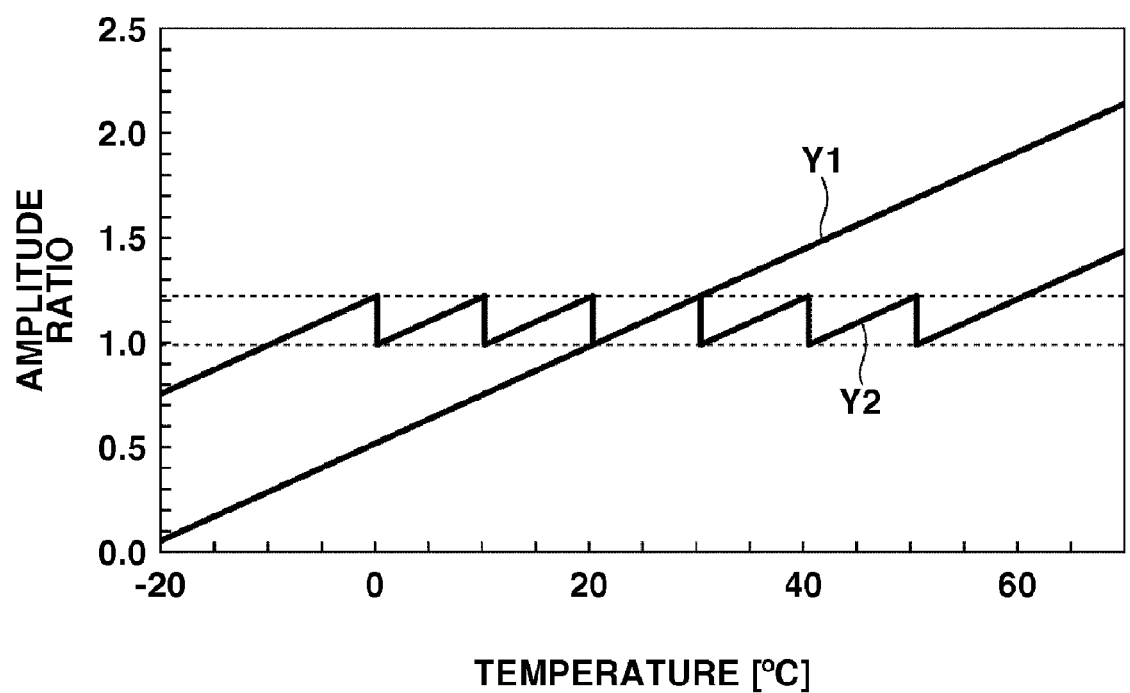
FIG. 15 is a characteristic graph illustrating a relationship between a temperature and an amplitude ratio.

In step S705, according to the temperature inside the camera body 1 and a table illustrated in FIG. 14, the MPU 100 determines a frequency level of a voltage to be applied to the piezoelectric element 430. According to the table illustrated in FIG. 14, seven frequency levels are defined at intervals of 10° C. in temperature (Temp). One of the time T per frequency step, the number N of frequency steps, and the frequency band F is changed each time the frequency level is changed by one level. Each of the frequency levels is set such that the amplitude of the vibration of the infrared cut filter 410 at each temperature falls within a predetermined range, as illustrated in FIG. 15. Practical values of the parameters T, N and F are set such that T1>T2>T3, N1>N2>N3, and F3>F2>F1 so as to obtain a target vibration amplitude as the amplitude of the vibration of the infrared cut filter 410. In a case where the temperature is lower than −10° C. or where the temperature is equal to or higher than 60° C., the MPU 100 inhibits a foreign-substance removing operation, because there is a high probability that the amplitude of the vibration of the infrared cut filter 410 does not fall within a predetermined range of vibration amplitudes even when one of the three parameters is further changed.

FIG. 15 illustrates a relationship Y1 between the temperature and the amplitude ratio measured using the amplitude of the vibration of the infrared cut filter 410 at a temperature of 20° C. as a reference, as illustrated in FIG. 21, and a relationship Y2 between the temperature and the amplitude ratio measured using the amplitude of the vibration of the infrared cut filter 410, which is based on the table illustrated in FIG. 14, at a temperature of 20° C. as a reference. The relationship Y2 uses a voltage of a frequency level "LEVEL 4", at which the amplitude of the vibration of the infrared cut filter 410 at normal temperature (20° C. to 30° C. in the present embodiment) falls within the predetermined range of vibration amplitudes, as a reference. The relationship Y2 is set such that one of the parameters, i.e., the time T per frequency step, the number N of frequency steps, and the frequency band F, is changed at high temperature, which ranges from 30° C. to 60° C. in the present embodiment, and at low temperature, which ranges from −10° C. to 20° C. in the present embodiment, and that the amplitude of the vibration of the infrared cut filter 410 is equal to the vibration amplitude corresponding to the frequency level "LEVEL 4" at normal temperature. For example, according to the relationship Y1, in which the vibration amplitude is measured on a certain condition, the ratio of a vibration amplitude at 20° C. to a vibration amplitude at 0° C. is about 1.4. On the other hand, according to the table illustrated in FIG. 14, in a case where the temperature changes from 20° C. to 0° C., the number N of frequency steps is changed from N2 to N1. In addition, the frequency band F is changed from F2 to F1. At that time, the values N2 and N1 of the number N of frequency steps are set such that the ratio of the vibration amplitude corresponding to the value N1 to the vibration amplitude corresponding to the value N2 is about 1.2 (see FIG. 10). In addition, the values F2 and F1 of the frequency band F are set such that the ratio of the vibration amplitude corresponding to the value F1 to the vibration amplitude corresponding to the value F2 is about 1.2 (see FIG. 11). That is, the vibration amplitude, which is about 1.4 times the vibration amplitude at 20° C., is generated by changing the two parameters at 0° C. According to the relationship Y2, the vibration amplitude at 20° C. is nearly equal to that at 0° C. Thus, when a voltage is applied to the piezoelectric element 430 according to the table illustrated in FIG. 14, the infrared cut filter 410 vibrates within the predetermined range of vibration amplitudes at both high and low temperatures according to the relationship Y2.

In the table illustrated in FIG. 14, the time T per frequency step, the number N of frequency steps, and the frequency band F are set as parameters. However, the parameters according to the present invention are not limited thereto. One of or a combination of the time T per frequency step, the number N of frequency steps, and the frequency band F can be used as parameters according to the vibration waveform or the sweep time. For example, in a case where the sweep time is fixed, only the frequency band F is used as a parameter. Alternatively, a combination of the time T per frequency step and the number N of frequency steps can be used as a parameter.

According to the present embodiment, each of the time T per frequency step, the number N of frequency steps, and the frequency band F is set in a stepwise manner. The manner of setting the parameters according to the present invention is not limited thereto. The parameters can be set by being calculated from the temperature inside the camera body 1 and one of the parameters illustrated in FIGS. 9 to 11 such that the amplitude of the vibration of the infrared cut filter 410 has a predetermined value.

Referring back to FIG. 13, in step S706, the MPU 100 controls the piezoelectric-element driving circuit 111 to apply a voltage at a set frequency level to the piezoelectric element 430 to remove a foreign substance adhering to the surface of the infrared cut filter 410. Then, the processing ends.

On the other hand, if a result of determination in step S704 is that the temperature inside the camera body 1 is equal to or higher than the second threshold value, the MPU 100 proceeds to step S707. In step S707, the MPU 100 causes the color liquid-crystal monitor 19 to display a warning message indicating that the amplitude of the vibration of the infrared cut filter 410 is large due to high temperature, that there is a fear of breakage of the infrared cut filter 410, and that a foreign-substance removing operation cannot be performed. In addition, the MPU 100 inhibits a foreign-substance removing operation. Then, the processing ends.

As described above, the present embodiment is configured to change at least one of the time T per frequency step, the number N of frequency steps, and the frequency band F based on the temperature inside the camera body 1, and to make the amplitude of the vibration of the infrared cut filter 410 at each temperature have substantially the same value. Consequently, the present embodiment can more efficiently remove a foreign substance without fear of breakage of the infrared cut filter 410 at high temperature and without reduction in the rate of removing a foreign substance at low temperature. In addition, the camera (imaging apparatus) according to the present embodiment requires only control operations by the MPU 100. The camera (imaging apparatus) according to the present embodiment does not require, e.g., a plurality of piezoelectric element driving circuits. Consequently, the camera (imaging apparatus) according to the present embodiment can prevent an increase in cost and size thereof.

Second Exemplary Embodiment

Next, a second exemplary embodiment of the present invention is described below. The first exemplary embodiment of the present invention uses the temperature sensor 112 as a status acquiring unit. However, the second exemplary embodiment acquires a temperature inside the camera body 1 according to another method.

Figure 16:
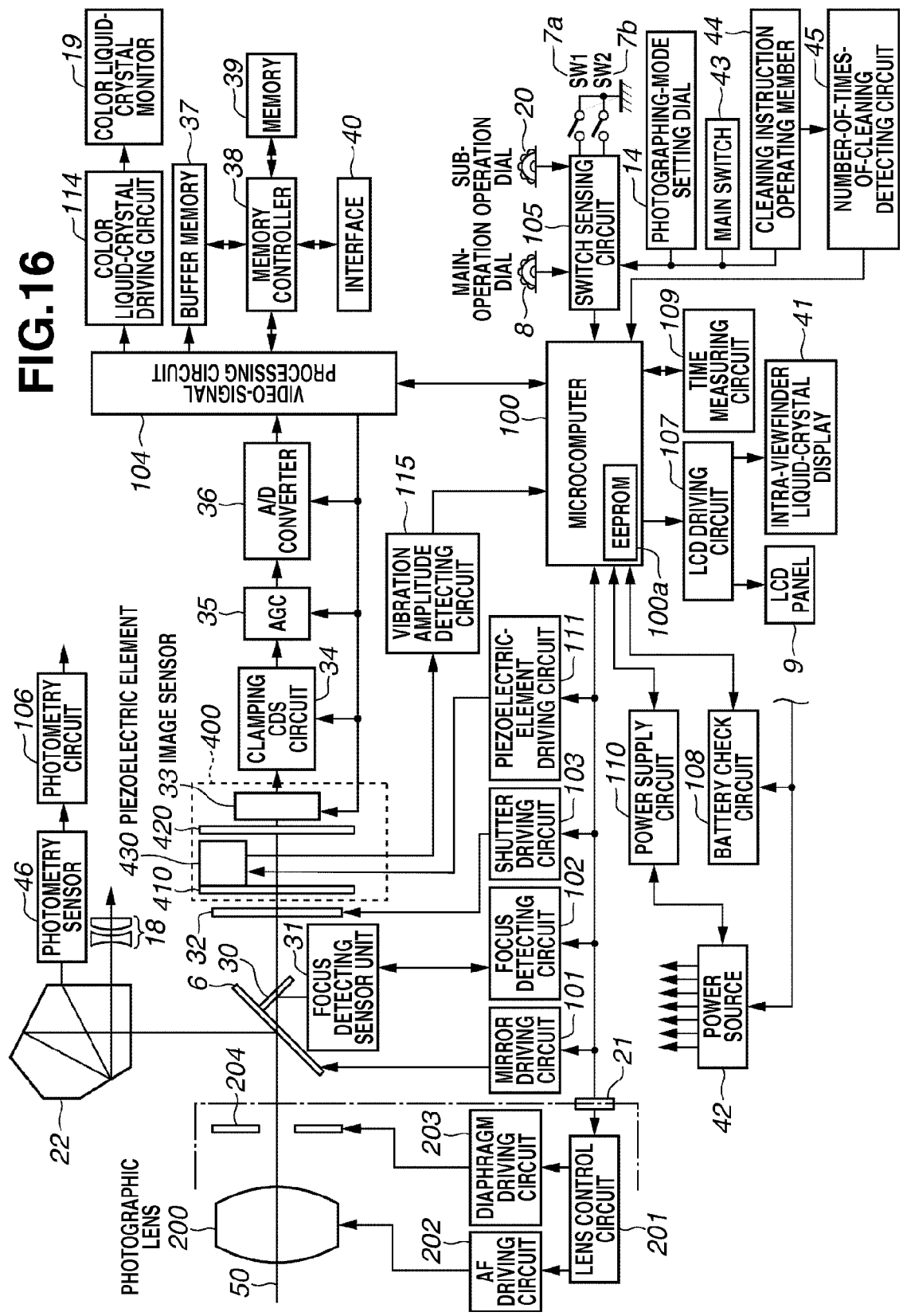
FIG. 16 is a block diagram illustrating an example electrical configuration of a digital single-lens reflex camera according to a second exemplary embodiment of the present invention.

FIG. 16 is a block diagram illustrating a primary electrical configuration of a digital single-lens reflex camera according to the second exemplary embodiment of the present invention. In FIG. 16, components similar to corresponding components of the digital single-lens reflex camera according to the first exemplary embodiment of the present invention are designated with the same reference numerals as those denoting the corresponding components of the first exemplary embodiment. Thus, a description of such components is omitted. When the infrared cut filter 410 is vibrated by applying a voltage of a predetermined frequency to one of a pair of piezoelectric elements 430, a vibration amplitude detecting circuit 115 detects an amplitude of unilateral vibration of the infrared cut filter 410 from a voltage output from the other piezoelectric element 430 due to a piezoelectric effect according to the amplitude of the vibration. The vibration amplitude detecting circuit 115 informs the MPU 100 of the detected unilateral vibration amplitude. The unilateral vibration amplitude at application of a voltage to one of the piezoelectric elements 430 is substantially half the vibration amplitude at application of a voltage to the pair of piezoelectric elements 430. Thus, the vibration amplitude at application of a voltage to the pair of piezoelectric elements 430 can be calculated by applying a voltage to one of the piezoelectric elements 430 on the same condition as that according to the relationship Y2 illustrated in FIG. 15 to detect a unilateral vibration amplitude. Accordingly, a temperature inside the camera body 1 can be calculated according to an approximate expression of the relationship Y1 illustrated in FIG. 15. Then, similar to the first exemplary embodiment, at least one of the time T per frequency step, the number N of frequency steps, and the frequency band F is changed such that the vibration amplitude falls within a predetermined range of vibration amplitudes.

Figure 17:
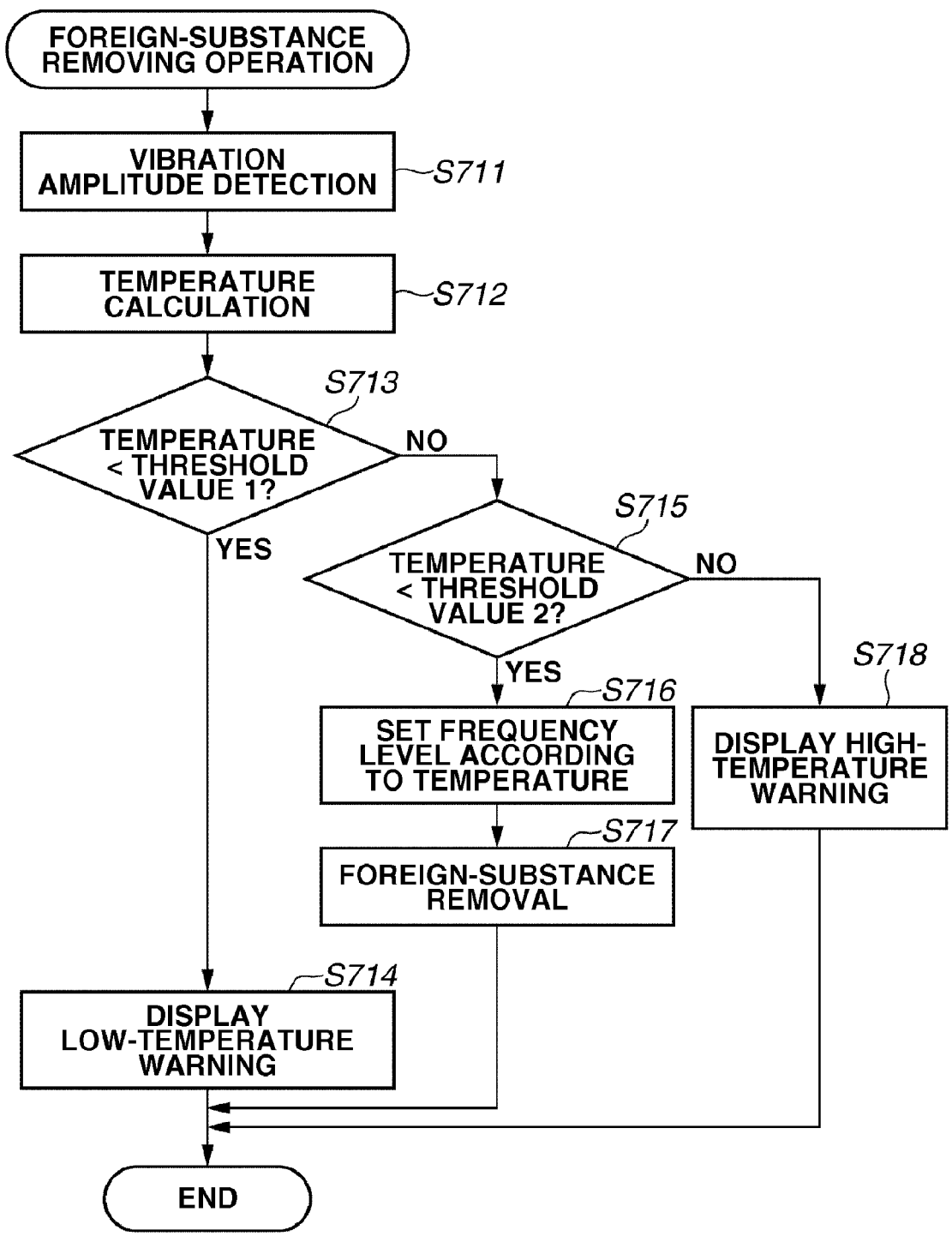
FIG. 17 is a flowchart illustrating an example operation for removing a foreign substance according to the second exemplary embodiment of the present invention.

FIG. 17 is a flowchart illustrating an operation for removing a foreign substance according to the second exemplary embodiment of the present invention. The operation illustrated in FIG. 17 is performed in step S603 illustrated in FIG. 12, instead of the operation illustrated in FIG. 13. The remaining processes are similar to the corresponding processes described in the first exemplary embodiment. In the present operation, the MPU 100 applies a voltage to one of the piezoelectric elements 430 and sets a frequency level of the voltage to be applied to the piezoelectric elements 430 according to a temperature calculated based on a unilateral vibration amplitude detected from a voltage output from the other piezoelectric element 430.

As illustrated in FIG. 17, the MPU 100 controls the piezoelectric-element driving circuit 111 to apply a voltage to one of the piezoelectric element 430. At that time, three parameters, i.e., the time T per frequency step, the number N of frequency steps, and the frequency band F are set on the same condition as that based on the relationship Y1 illustrated in FIG. 15. In step S711, the vibration amplitude detecting circuit 115 detects a unilateral vibration amplitude from a voltage output from the other piezoelectric element 430 and informs the MPU 100 of the detected unilateral vibration amplitude. Then, in step S712, the MPU 100 calculates an amplitude of the vibration of the infrared cut filter 410 at application of a voltage to a pair of piezoelectric elements 430 on the same condition as that according to the relationship Y1 illustrated in FIG. 15 from the unilateral vibration amplitude. Then, the MPU 100 calculates a temperature according to the relationship Y1 illustrated in FIG. 15.

In step S713, the MPU 100 determines whether the calculated temperature is less than a first threshold value (THRESHOLD VALUE 1). The first threshold value according to the present embodiment is −10° C., which is similar to that according to the first exemplary embodiment.

If a result of determination in step S713 is that the calculated temperature is less than the first threshold value, the MPU 100 proceeds to step S714. In a case where the calculated temperature is less than the first threshold value, there is a possibility that a vibration amplitude considered to be required to remove a foreign substance cannot be obtained even when one of the parameters, i.e., the frequency band F, the number N of frequency steps, and the time T per frequency step, is changed. In step S714, the MPU 100 causes the color liquid-crystal monitor 19 to display a warning message indicating that the vibration amplitude is less than that required to remove a foreign substance due to low temperature, and that a foreign-substance removing operation cannot be performed. In addition, the MPU 100 inhibits a foreign-substance removing operation. Then, the processing ends.

On the other hand, if a result of determination in step S713 is that the calculated temperature is equal to or higher than the first threshold value, the MPU 100 proceeds to step S715. In step S715, the MPU 100 determines whether the calculated temperature is less than a second threshold value (THRESHOLD VALUE 2). The second threshold value is 60° C., which is similar to that according to the first exemplary embodiment.

If a result of determination in step S715 is that the calculated temperature is less than the second threshold value, the MPU 100 proceeds to step S716. In a case where the calculated temperature is less than the second threshold value, a stress generated due to the amplitude of the vibration of the infrared cut filter 410 does not exceed a predetermined value due to a change of one of the parameters, i.e., the frequency band F, the number N of frequency steps, and the time T per frequency step.

In step S716, the MPU 100 determines a frequency level of a voltage to be applied to the piezoelectric elements 430 according to the calculated temperature and the table illustrated in FIG. 14. In step S717, the MPU 100 controls the piezoelectric-element driving circuit 111 to apply a voltage at a frequency level set at the piezoelectric elements 430, and removes a foreign substance adhering to the surface of the infrared cut filter 410. Then, the processing ends.

On the other hand, a result of determination in step S715 is that the calculated temperature is equal to or higher than the second threshold value, the MPU 100 proceeds to step S718. In step S718, the MPU 100 causes the color liquid-crystal monitor 19 to display a warning message indicating that the vibration amplitude is large due to high temperature, that there is a fear of breakage of the infrared cut filter 410, and that a foreign-substance removing operation cannot be performed. In addition, the MPU 100 inhibits a foreign-substance removing operation. Then, the processing ends.

According to the second exemplary embodiment, advantages similar to those of the first exemplary embodiment can be obtained. In addition, a temperature sensor is made to be unnecessary. Thus, a reduction in cost and a miniaturization of the camera can be achieved.

Although a voltage is applied to one of a pair of piezoelectric elements 430 and a voltage is output from the other piezoelectric element 430, a manner of using the piezoelectric elements 430 according to the present invention is not limited thereto. A sensor phase for calculating a vibration amplitude can be provided in one of the piezoelectric elements 430 to calculate the vibration amplitude and the temperature from the sensor phase.

Third Exemplary Embodiment

Next, a third exemplary embodiment of the present invention is described below. The third exemplary embodiment uses the number-of-times-of-cleaning detecting circuit 45 as a status acquiring unit to acquire information representing the number of times of cleaning (the number of times of starting the cleaning mode). A surface of the infrared cut filter 410 is subjected to physical contact by being directly cleaned by a user. In a case where a user iteratively and directly cleans the surface of the infrared cut filter 410, an allowable stress of the infrared cut filter 410 against breakage is reduced. Accordingly, it is required to reduce a vibration amplitude applied to the infrared cut filter 410 according to an increase in the number of times of cleaning.

Figure 18:
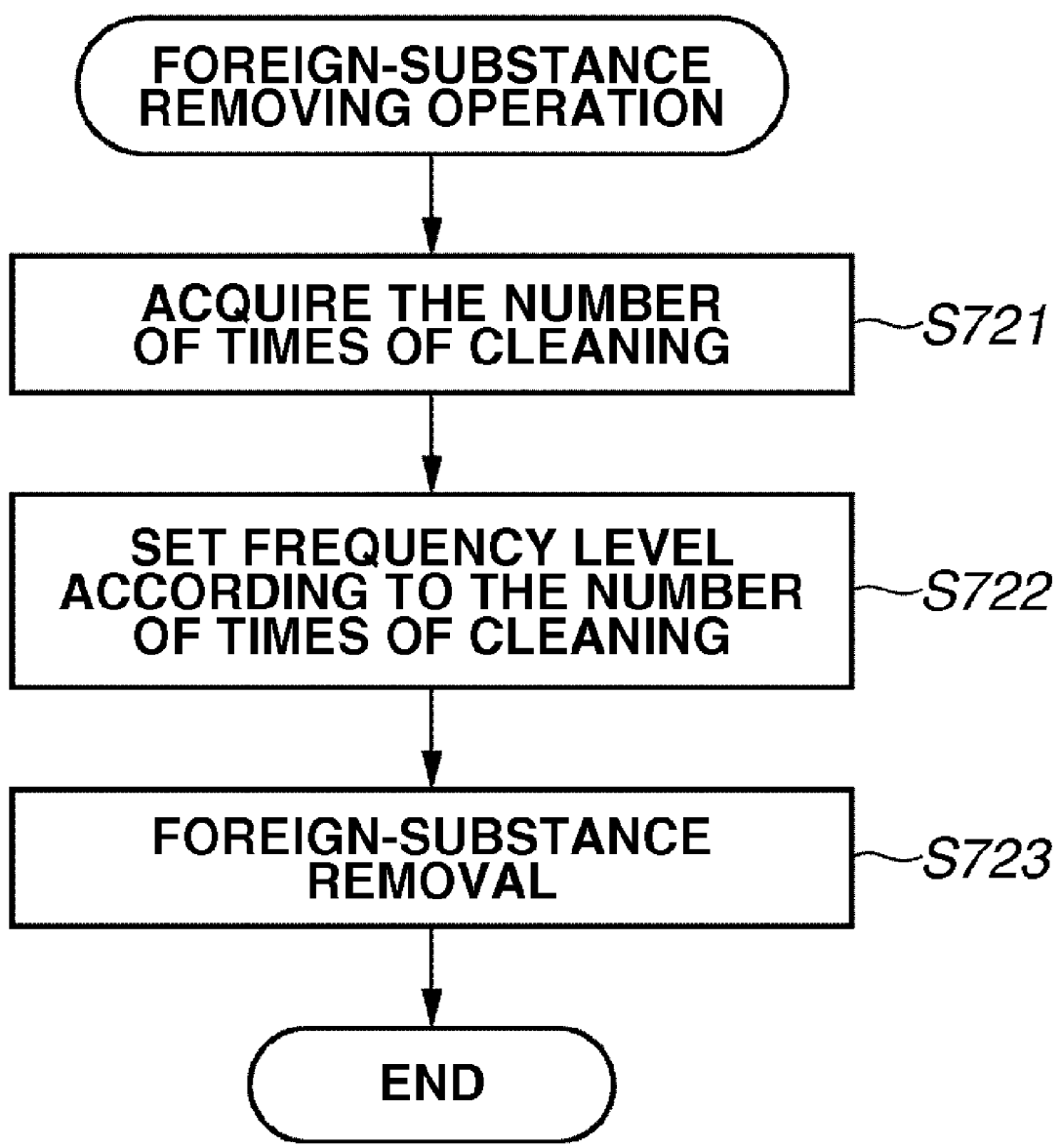
FIG. 18 is a flowchart illustrating an example operation for removing a foreign substance according to a third exemplary embodiment of the present invention.

FIG. 18 is a flowchart illustrating a foreign-substance removing operation according to the third exemplary embodiment of the present invention. The foreign-substance removing operation illustrated in FIG. 18 is performed in step S603 in FIG. 12, instead of the operation illustrated in FIG. 13, which is performed in the first exemplary embodiment. The remaining processes are similar to the corresponding processes described in the first exemplary embodiment. In the foreign-substance removing operation according to the third exemplary embodiment, the MPU 100 sets a frequency level of a voltage to be applied to the piezoelectric element 430 according to the number of times of cleaning by a user.

In the operation illustrated in FIG. 18, first, in step S721, the number-of-times-of-cleaning detecting circuit 45 informs the MPU 100 of information representing the number C of times of cleaning.

Next, in step S722, the MPU 100 determines a frequency level of a voltage to be applied to the piezoelectric element 430 according to the number C of times of cleaning and a table illustrated in FIG. 19. As illustrated in FIG. 19, the table according to the present embodiment defines five frequency levels. One of the time T per frequency step, the number N of frequency steps, and the frequency band F is changed each time the frequency level is changed by one level. Each of the frequency levels is set such that a stress generated at the amplitude of the vibration of the infrared cut filter 410 at removal of a foreign substance is less than a predetermined stress at each of the numbers C of times of cleaning. The predetermined stress is set at a stress determined to obtain a predetermined safety rate or a predetermined failure probability using the strength distribution of the infrared cut filter 410, which is obtained at each of the numbers of times of cleaning. Practical values of the parameters T, N and F are set such that T11>T12>T13, N11>N12, and F12>F11 to obtain a target vibration amplitude, as will be described below with reference to FIG. 20.

Figure 20:
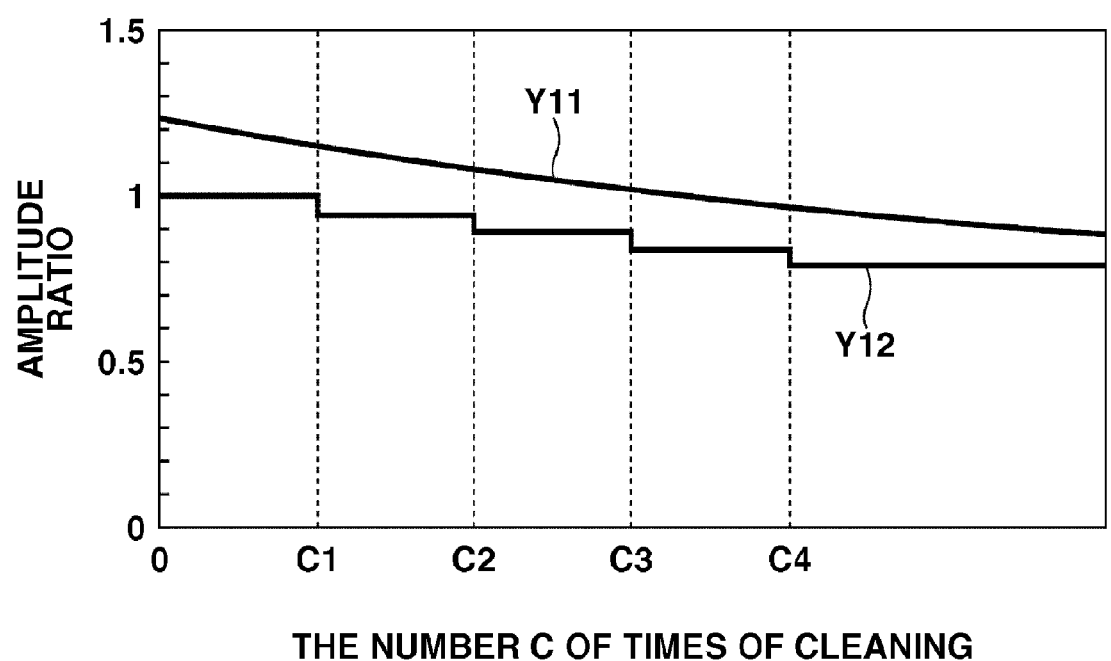
FIG. 20 is a characteristic graph illustrating a relationship between the number of times of cleaning and amplitude ratios.

FIG. 20 is a characteristic graph illustrating a relationship between the number C of times of cleaning, an amplitude ratio Y11, at which an allowance stress at each of the number C of times of cleaning is obtained, and an amplitude ratio Y12, which corresponds to a target value of the vibration amplitude to be applied, using an amplitude ratio at the time of using a vibration amplitude that is obtained according to the table illustrated in FIG. 19 in a case where the number C of times of cleaning is 0 as a reference. More particularly, FIG. 20 illustrates that there is a fear of breakage of the infrared cut filter 410 when an amplitude ratio exceeding the amplitude ratio Y11 is applied, and that the amplitude ratio Y12 corresponding to a target value of the vibration amplitude to be applied is set according to the amplitude ratio Y11 so as not to exceed the amplitude ratio Y11. According to the amplitude ratio Y11, the rate of the amplitude ratio in a case where the number C of times of cleaning is 0 to that in a case where the number C of times of cleaning is C2 is about 0.9. On the other hand, according to the table illustrated in FIG. 19, in a case where the number C of times of cleaning is changed from 0 to C2, the time T per frequency step is changed from T11 to T12. In addition, the number N of frequency steps is changed from N11 to N12. At that time, the ratio of the vibration amplitude at the time T of T12 to that at the time T of T11 is about 0.95. The ratio of the vibration amplitude at the number N of N12 to that at the number N of N11 is about 0.95. That is, when the number C of times of cleaning is C2, a vibration amplitude whose value is about 0.9 times the value of the vibration amplitude at the number C of 0 is generated by changing the two parameters T and N. Thus, the amplitude ratio is set to generate a stress that is less than a predetermined stress, as the amplitude ratio Y12 illustrated in FIG. 20. Consequently, even when the number of times of cleaning is increased, the infrared cut filter 410 can be vibrated without fear of breakage thereof by applying a voltage to the piezoelectric element 430 according to the table illustrated in FIG. 19, similar to the case where the amplitude ratio Y12 is applied.

In step S723, the MPU 100 controls the piezoelectric element-driving circuit 111 to apply a voltage of the set frequency level to the piezoelectric element 430. Thus, a foreign substance adhering to the surface of the infrared cut filter 410 can be removed. Then, the processing ends.

According to the third exemplary embodiment, at least one of the time T per frequency step, the number N of frequency steps, and the frequency band F is changed according to the number C of times of cleaning. Thus, a stress generated due to the vibration amplitude of the infrared cut filter 410 is set to be less than the predetermined stress. Consequently, a foreign substance adhering to the surface of the infrared cut filter 410 can more efficiently be removed without fear of breakage thereof.

Other Exemplary Embodiments

The present invention can be achieved as follows. First, a storage medium (or a recording medium), on which software program code for implementing the above-described functions of the exemplary embodiments is recorded, is supplied to a system or an apparatus. Then, a computer (or a central processing unit (CPU) or an MPU) of the system or apparatus reads and executes the program code stored in the storage medium. In this case, the program code itself read from the storage medium implements the functions of the exemplary embodiments. The storage medium storing the program code is included in the present invention.

The present invention can be achieved as follows, in addition to the implementation of the functions of the exemplary embodiments by executing the program code read by the computer. That is, a part or all of actual processing is performed by an operating system (OS) or the like running on the computer. The functions of the exemplary embodiments are implemented by the processing. The storage medium for storing the program code includes, e.g., a floppy disk, a hard disk, a read-only memory (ROM), a random access memory (RAM), magnetic tape, a nonvolatile memory card, a compact disc read-only memory (CD-ROM), a compact disc recordable (CD-R), a digital versatile disc (DVD), an optical disk, or a magneto-optical (MO) disk. Alternatively, computer networks, such as a local area network (LAN) and a wide area network (WAN), can be used for supplying program code.

Although an example of performing a foreign-substance removing operation at the start-up of the camera body 1 has been described in the foregoing exemplary embodiment, the present invention is not limited thereto. An imaging apparatus can be configured to perform a foreign-substance removing operation in response to, e.g., a user's operation.

Although the above-described exemplary embodiment is configured to excite a bending vibration of the infrared cut filter 410, the present invention is not limited thereto. An imaging apparatus can be configured to use an optical low-pass filter configured by bonding up a birefringent plate, a phase plate, and an infrared cut filter, a single birefringent plate, or a single phase plate as the optical member provided on the imaging optical axis, and to excite a bending vibration in the optical member.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-170723 filed Jun. 28, 2007, which is hereby incorporated by reference herein in its entirety.

What is claimed is:

1. An imaging apparatus comprising:
an image sensor configured to convert an optical image of a subject into an electric signal;
an optical member provided on an imaging optical system in front of the image sensor;
a vibrating device configured to vibrate the optical member;
a temperature acquiring unit configured to acquire a temperature inside the imaging apparatus; and
a control unit configured to control the vibrating device to vibrate the optical member at each of frequency steps into which a predetermined frequency band is divided and to change at least one of the frequency band, a number of frequency steps into which the frequency band is divided, and a time per frequency step based on the temperature,
wherein the control unit is configured to inhibit vibration of the optical member in a case where the temperature is outside a predetermined range.

2. The imaging apparatus according to claim 1, wherein, when the temperature acquired by the status acquiring unit is within a predetermined range, the control unit is configured to change at least one of the frequency band, the number of frequency steps into which the frequency band is divided, the time per frequency step such that a vibration amplitude of the optical member is within a predetermined range of vibration amplitudes.

3. The imaging apparatus according to claim 2, wherein the predetermined range of vibration amplitudes is set such that a stress generated in the optical member does not exceed a predetermined stress and that a vibration amplitude considered to be required to remove a foreign substance adhering to a surface of the optical member.

4. A method for controlling an imaging apparatus including an image sensor configured to convert an optical image of a subject into an electric signal, an optical member provided on an imaging optical system in front of the image sensor, a vibrating device configured to vibrate the optical member, and a temperature acquiring unit configured to acquire a temperature inside the imaging apparatus, the method comprising:
vibrating the optical member at each of frequency steps into which a predetermined frequency band is divided;
changing at least one of the frequency band, a number of frequency steps into which the frequency band is divided, a time per frequency step based on the temperature;
inhibiting vibration of the optical member where the temperature is outside a predetermined range.

5. A computer readable non-transitory medium containing computer-executable instructions for executing a method for controlling an imaging apparatus including an image sensor configured to convert an optical image of a subject into an electric signal, an optical member provided on an imaging optical system in front of the image sensor, a vibrating device configured to vibrate the optical member, and a temperature acquiring unit configured to acquire a temperature inside the imaging apparatus, the medium comprising:

computer-executable instructions for vibrating the optical member at each of frequency steps into which a predetermined frequency band is divided;

computer-executable instructions for changing at least one of the frequency band, a number of frequency steps into which the frequency band is divided, a time per frequency step based on the temperature; and computer-executable instructions for inhibiting the vibrating of the optical member where the temperature is outside a predetermined range.

6. An imaging apparatus comprising:

an image sensor configured to convert an optical image of a subject into an electric signal;

an optical member provided on an imaging optical system in front of the image sensor;

a vibrating device configured to vibrate the optical member;

a temperature acquiring unit configured to acquire a temperature inside the imaging apparatus; and a control unit configured to control the vibrating device to vibrate the optical member at each of frequency steps into which a predetermined frequency band is divided, wherein the control unit enlarges the frequency band, decreases a number of frequency steps into which the frequency band is divided or shortens a time per frequency step when the temperature becomes higher, so as a vibration amplitude of the optical member to become within the predetermined range at both high and low temperatures, wherein, in a case where the temperature is outside a predetermined range, the control unit is configured to inhibit vibration of the optical member.

\* \* \* \* \*